(12) United States Patent
Nakamura et al.

(10) Patent No.: US 8,184,861 B2
(45) Date of Patent: May 22, 2012

(54) FEATURE INFORMATION MANAGEMENT APPARATUSES, METHODS, AND PROGRAMS

(75) Inventors: Masaki Nakamura, Okazaki (JP); Koichi Nakao, Okazaki (JP); Motoki Kanba, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 1107 days.

(21) Appl. No.: 12/073,876

(22) Filed: Mar. 11, 2008

(65) Prior Publication Data

US 2008/0240506 A1    Oct. 2, 2008

(30) Foreign Application Priority Data

Mar. 30, 2007 (JP) ................................. 2007-091047

(51) Int. Cl.
*G06K 9/00* (2006.01)
(52) U.S. Cl. .................. 382/104; 382/100; 382/103
(58) Field of Classification Search .............. 382/100, 382/104
See application file for complete search history.

(56) References Cited

U.S. PATENT DOCUMENTS

| | | | |
|---|---|---|---|
| 4,527,155 A | 7/1985 | Yamaki et al. | |
| 5,123,085 A | 6/1992 | Wells et al. | |
| 5,280,577 A | 1/1994 | Trevett et al. | |
| 5,469,514 A | 11/1995 | Kawamura | |
| 5,521,579 A * | 5/1996 | Bernhard | 340/438 |
| 5,559,938 A | 9/1996 | Van Roekel et al. | |
| 5,724,072 A | 3/1998 | Freeman et al. | |
| 5,790,714 A | 8/1998 | McNeil et al. | |
| 6,047,234 A * | 4/2000 | Cherveny et al. | 701/200 |
| 6,128,573 A | 10/2000 | Nomura | |
| 6,226,592 B1 * | 5/2001 | Luckscheiter et al. | 701/301 |
| 6,281,808 B1 | 8/2001 | Glier et al. | |
| 6,292,111 B1 * | 9/2001 | Ishikawa et al. | 340/937 |
| 6,356,836 B1 | 3/2002 | Adolph | |
| 6,396,417 B2 | 5/2002 | Lee | |
| 6,453,233 B1 | 9/2002 | Kato | |
| 6,516,262 B2 | 2/2003 | Takenaga et al. | |

(Continued)

FOREIGN PATENT DOCUMENTS

DE    100 28 130 A1    12/2001

(Continued)

OTHER PUBLICATIONS

Jul. 17, 2007 International Search Report issued in International Application No. PCT/JP2007/061626.

(Continued)

*Primary Examiner* — Stephen R Koziol
(74) *Attorney, Agent, or Firm* — Oliff & Berridge, PLC

(57) ABSTRACT

Apparatuses, methods and programs store a plurality of target types, each target type having recognition attribute information indicating the likelihood that the target type will be recognized based on a type of road or a type of area. The apparatuses, methods and programs acquire vehicle position information indicating a current position of a vehicle, acquire image information in the vicinity of the vehicle, and acquire road attribute information about a road on which the vehicle is traveling, the road attribute information acquired based on the vehicle position information. The apparatuses, methods and programs determine a target type defining a target for image recognition within the image information, the target type being determined based on the acquired road attribute information and the stored recognition attribute information, and perform image recognition of a target feature included in the image information, the target feature being of the determined target type.

18 Claims, 12 Drawing Sheets

U.S. PATENT DOCUMENTS

| | | | |
|---|---|---|---|
| 6,516,273 B1 | 2/2003 | Pierowicz et al. | |
| 6,556,917 B1 | 4/2003 | Wawra et al. | |
| 6,560,529 B1 * | 5/2003 | Janssen | 701/200 |
| 6,615,130 B2 | 9/2003 | Myr | |
| 6,724,320 B2 | 4/2004 | Basson et al. | |
| 6,728,623 B2 | 4/2004 | Takenaga et al. | |
| 6,737,963 B2 * | 5/2004 | Gutta et al. | 340/435 |
| 6,803,913 B1 | 10/2004 | Fushiki et al. | |
| 6,925,378 B2 | 8/2005 | Tzamaloukas | |
| 6,927,774 B2 | 8/2005 | Yano | |
| 6,972,675 B2 | 12/2005 | Mills et al. | |
| 6,989,766 B2 | 1/2006 | Mese et al. | |
| 7,133,661 B2 | 11/2006 | Hatae et al. | |
| 7,194,347 B2 | 3/2007 | Harumoto et al. | |
| 7,254,482 B2 | 8/2007 | Kawasaki et al. | |
| 7,304,653 B2 | 12/2007 | Ueno | |
| 7,466,227 B2 | 12/2008 | Chen et al. | |
| 7,603,215 B2 * | 10/2009 | Matsumoto et al. | 701/41 |
| 2001/0034575 A1 | 10/2001 | Takenaga et al. | |
| 2002/0115423 A1 | 8/2002 | Hatae et al. | |
| 2003/0078718 A1 | 4/2003 | Takenaga et al. | |
| 2004/0130552 A1 | 7/2004 | Duluk et al. | |
| 2004/0143381 A1 * | 7/2004 | Regensburger et al. | 701/36 |
| 2005/0243104 A1 | 11/2005 | Kinghorn | |
| 2006/0114125 A1 | 6/2006 | Kubota et al. | |
| 2008/0231469 A1 | 9/2008 | Knoll et al. | |
| 2008/0273757 A1 * | 11/2008 | Nakamura et al. | 382/104 |

FOREIGN PATENT DOCUMENTS

| | | |
|---|---|---|
| EP | 0 738 946 A1 | 10/1996 |
| EP | 0 782 118 A1 | 7/1997 |
| EP | 0 921 509 A2 | 6/1999 |
| EP | 1 127 727 A2 | 8/2001 |
| JP | A-62-501650 | 7/1987 |
| JP | A-62-187884 | 8/1987 |
| JP | A-04-144479 | 5/1992 |
| JP | A-05-094574 | 4/1993 |
| JP | A-06-127318 | 5/1994 |
| JP | A-08-194432 | 7/1996 |
| JP | A-10-027294 | 1/1998 |
| JP | A-10-187033 | 7/1998 |
| JP | A-11-306498 | 11/1999 |
| JP | A-2000-026894 | 1/2000 |
| JP | A-2000-029450 | 1/2000 |
| JP | A-2000-321081 | 11/2000 |
| JP | A-2001-075967 | 3/2001 |
| JP | A-2001-202544 | 7/2001 |
| JP | A-2001-236600 | 8/2001 |
| JP | A-2002-286459 | 10/2002 |
| JP | A-2003-036500 | 2/2003 |
| JP | A-2003-078654 | 3/2003 |
| JP | A-2003-256257 | 9/2003 |
| JP | A-2003-279363 | 10/2003 |
| JP | A-2004-004240 | 1/2004 |
| JP | A-2004-051006 | 2/2004 |
| JP | A-2004-069549 | 3/2004 |
| JP | A-2004-171289 | 6/2004 |
| JP | A-2004-362287 | 12/2004 |
| JP | A-2005-165639 | 6/2005 |
| JP | A-2006-38558 | 2/2006 |
| JP | A-2006-084257 | 3/2006 |
| JP | A-2006-189326 | 7/2006 |
| JP | A-2006-275690 | 10/2006 |
| JP | A-2006-330908 | 12/2006 |
| JP | A-2007-041916 | 2/2007 |
| JP | A-2007-041961 | 2/2007 |
| JP | A-2007-131169 | 5/2007 |
| JP | A-2007-316025 | 12/2007 |
| WO | WO 86/02764 | 5/1986 |
| WO | WO 2005/044619 A1 | 5/2005 |
| WO | WO 2006/080547 A1 | 8/2006 |

OTHER PUBLICATIONS

Jul. 9, 2009 Final Rejection issued in U.S. Appl. No. 11/397,601.
Aug. 6, 2009 Notification of Reasons for Rejection issued in Patent Application No. 2006-161603.
Aug. 20, 2009 Office Action (Decision of Rejection) issued in Japanese Patent Application No. 2005-111272.
Aug. 20, 2009 Notification of Reasons for Rejection issued in Patent Application No. 2007-171894.
Aug. 20, 2009 Notification of Reasons for Rejection issued in Patent Application No. 2007-091047.
Sep. 1, 2009 Notification of Reasons for Rejection issued in Patent Application No. 2007-255569.
Dec. 11, 2009 Rejection issued in U.S. Appl. No. 11/397,601.
Jan. 28, 2009 Rejection issued in U.S. Appl. No. 11/397,601.
Sep. 3, 2008 Rejection issued in U.S. Appl. No. 11/397,601.
Jun. 23, 2009 European Search Report issued in Application No. EP 08 00 4829.
Oct. 21, 2009 Notice of Allowanced issued in U.S. Appl. No. 12/155,642.
Apr. 29, 2009 Rejection issued in U.S. Appl. No. 12/155,642.
Oct. 16, 2007 Rejection issued in U.S. Appl. No. 11/176,212.
Mar. 7, 2008 Notice of Allowance issued in U.S. Appl. No. 11/176,212.
Kambic S. F.; "Rotated Matrix Characters/Graphics System" Apr. 1980, IBM Technical Disclosure Bulletin, IBM Corporation, New York, pp. 4988-4990.
Fernyhough, J. et al., "Building Qualitative Event Models Automatically from Visual Input", Proceedings of IEEE 6$^{th}$ International Conference on Computer Vision, Jan. 4-7, 1998, Bombay, India, pp. 350-355.
Kubota et al., U.S. Appl. No. 12/155,642, filed Jun. 6, 2008.
Yamaguchi et al., U.S. Appl. No. 11/397,601, filed Apr. 5, 2006.
Takahata et al., U.S. Appl. No. 12/227,492, filed Feb. 23, 2009.
Nakamura et al., U.S. Appl. No. 12/076,067, filed Mar. 13, 2008.
Mori et al., U.S. Appl. No. 12/232,069, filed Sep. 10, 2008.

* cited by examiner

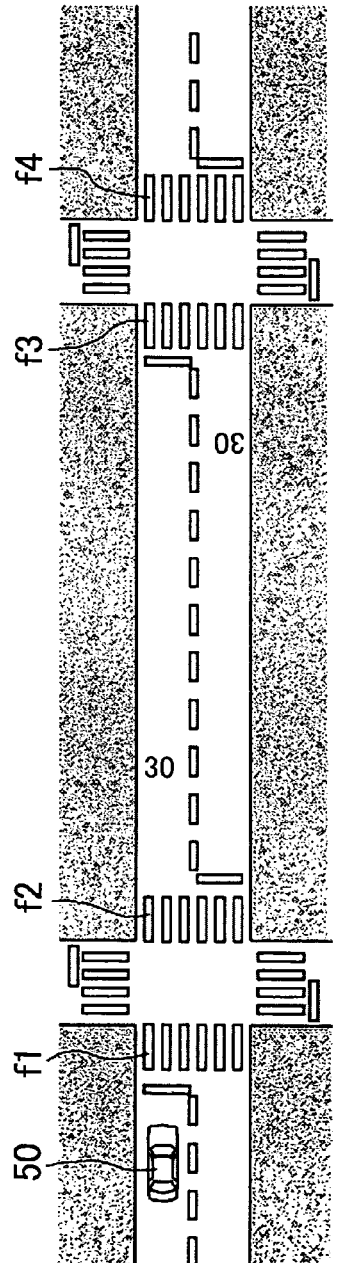
FIG. 5A
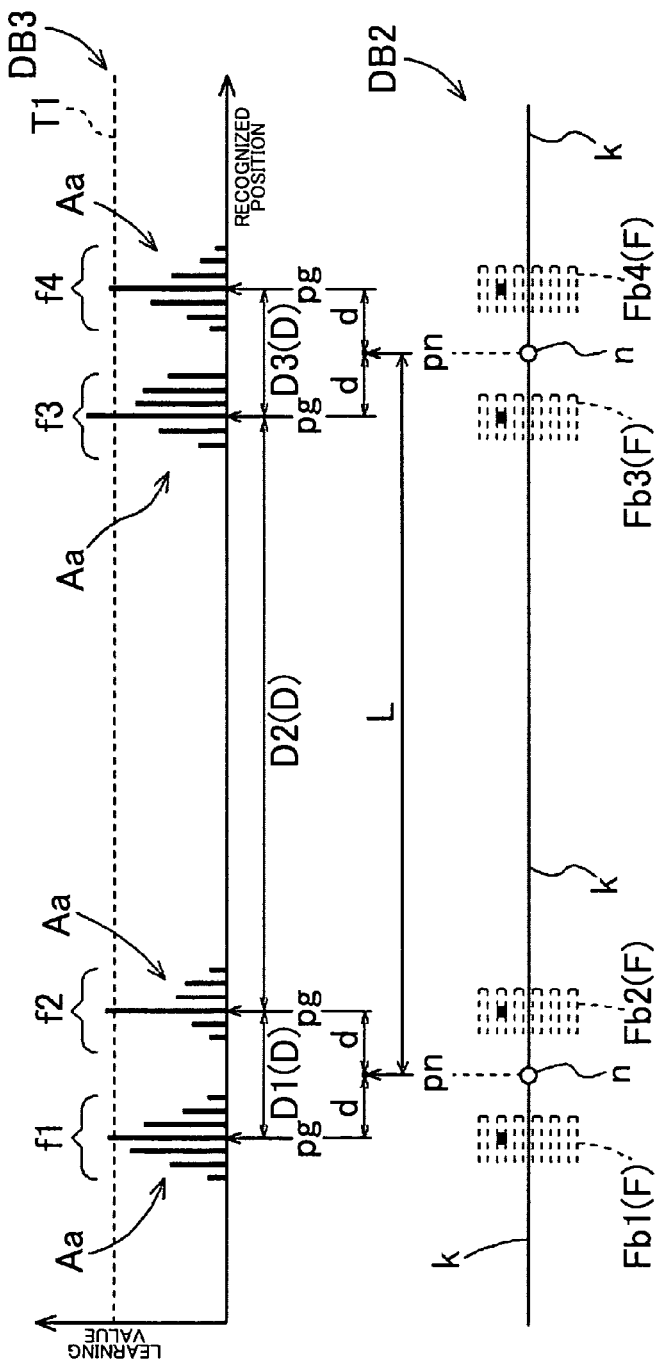
FIG. 5B
FIG. 5C

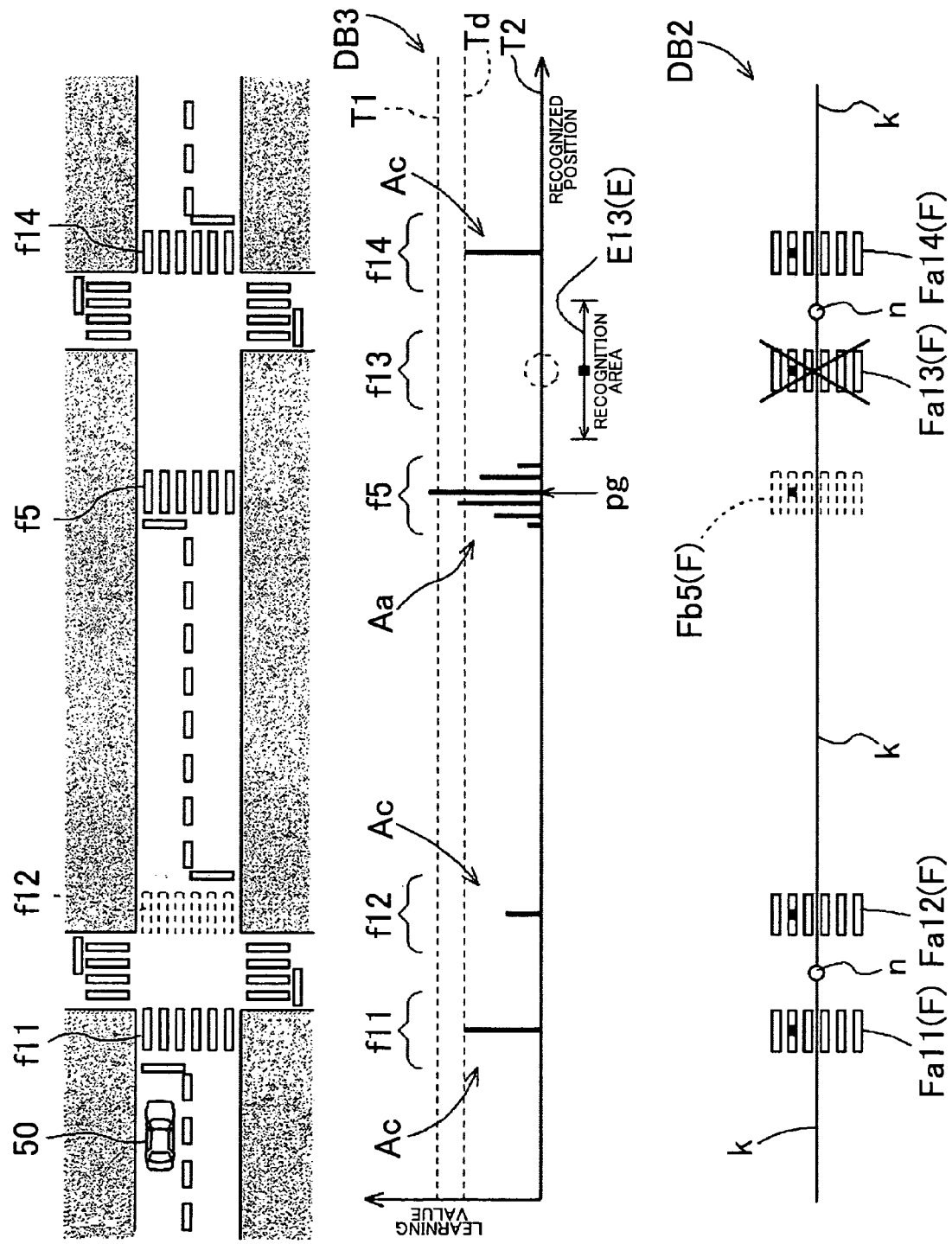

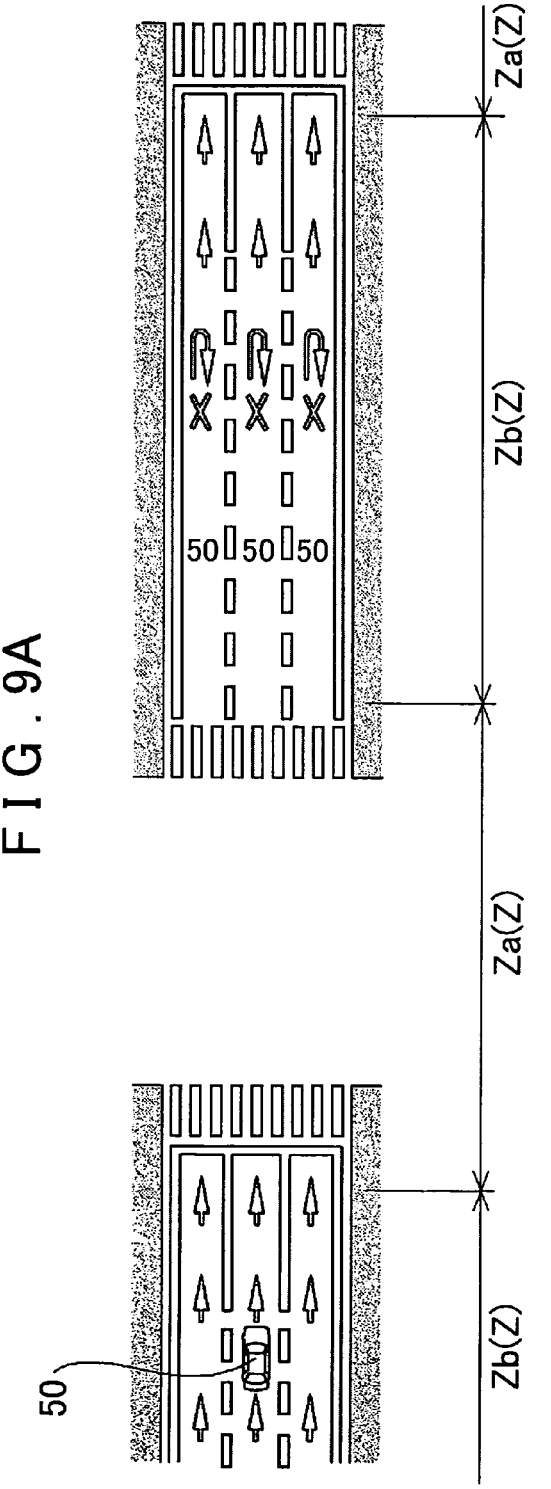

| FEATURE TYPE | PREDICTED RECOGNITION RATIO | APPEARANCE FREQUENCY | RECOGNITION FREQUENCY | ARRANGEMENT TENDENCY | PRIORITY ORDER |
|---|---|---|---|---|---|
| T-INTERSECTION | 90% | 9.8 | 8.8 | ON NODE :Zc | 1 |
| CROSS INTERSECTION | 80% | 10.5 | 8.4 | ON NODE :Zc | 1 |
| STOP LINE | 55% | 19.6 | 10.8 | ON LINK :Zd | 1 |
| PEDESTRIAN CROSSING | 80% | 5.1 | 4.1 | ON LINK :Zd | 2 |
| PEDESTRIAN CROSSING AHEAD | 60% | 5.3 | 3.2 | ON LINK :Zd | 3 |

S2   S1   S3

FEATURE INFORMATION MANAGEMENT APPARATUSES, METHODS, AND PROGRAMS

INCORPORATION BY REFERENCE

The disclosure of Japanese Patent Application No. 2007-091047, filed on Mar. 30, 2007, including the specification, drawings, and abstract is incorporated herein by reference in its entirety.

BACKGROUND

1. Related Technical Fields

The present invention relates to an image recognition apparatus and an image recognition method that provide image recognition processing of target features included in the image information in the neighborhood of a vehicle acquired by an imaging apparatus or the like installed in the vehicle.

2. Related Art

Conventional apparatuses perform image recognition processing of target features included in image information of the vicinity of a vehicle (for example, refer to Japanese Patent Application Publication Nos. JP-A-2006-038558 and JP-A-2006-275690). The image information may be acquired by an imaging apparatus or the like installed in the vehicle. Based on the result of the image recognition, information of the features is collected. The apparatuses treat traffic signs and road traffic information boards installed on the road as target features. The apparatuses recognize the image of the target features included in the image information acquired by the imaging apparatus and store the resulting feature information (such as sign information) into a map database associated with position information and zone information. During image recognition, specific types of traffic signs, road traffic information boards, and so forth, are recognized by means of pattern matching or the like.

SUMMARY

However, in the above apparatuses, image recognition processing is performed to identify the feature type from numerous feature types such as traffic signs and road traffic information boards which can be included in the image information. As a result, it is necessary to apply a recognition algorithm to an item of image information with respect to each of the numerous feature types, thus increasing the processing load for image recognition processing. Consequently, it becomes difficult to perform the image recognition processing at a high speed, or a manufacturing cost increases to achieve an apparatus that can process such image recognition at high speed.

To reduce the processing load for image recognition processing, it is conceivable to limit the types of features as targets of the image recognition. However, if the image recognition processing is performed uniformly for features of the same feature type without regard for circumstances in the neighborhood of a vehicle, etc., there can be a case in which the image recognition processing is performed for features of the feature type that scarcely exists in the vicinity of the vehicle. Therefore, the image recognition processing of features cannot be performed efficiently for the obtained image information, and it is thus difficult to collect information of the features efficiently.

Exemplary implementations of the broad principles described herein provide image recognition apparatuses, methods, and programs that can reduce the processing load for image recognition processing and can perform image recognition processing of features efficiently.

Exemplary implementations provide apparatuses, methods and programs that store a plurality of target types, each target type having recognition attribute information indicating the likelihood that the target type will be recognized based on a type of road or a type of area. The apparatuses, methods and programs acquire vehicle position information indicating a current position of a vehicle, acquire image information in the vicinity of the vehicle, and acquire road attribute information about a road on which the vehicle is traveling, the road attribute information acquired based on the vehicle position information. The apparatuses, methods and programs determine a target type defining a target for image recognition within the image information, the target type being determined based on the acquired road attribute information and the stored recognition attribute information, and perform image recognition of a target feature included in the image information, the target feature being of the determined target type.

BRIEF DESCRIPTION OF THE DRAWINGS

Exemplary implementations will now be described with reference to the accompanying drawings, wherein:

FIGS. 5A-5C are diagrams for explaining an outline of collection processing of feature information when a vehicle travels on a road in which feature information is not provided;

FIGS. 6A-6C are diagrams for explaining an outline of modification processing of feature information when a vehicle travels on a road in which feature information is already provided;

FIGS. 9A and 9B are diagrams illustrating a specific example of road zone divisions and target type determination processing, when a road type is an urban road;

DETAILED DESCRIPTION OF EXEMPLARY IMPLEMENTATIONS

Figure 1:
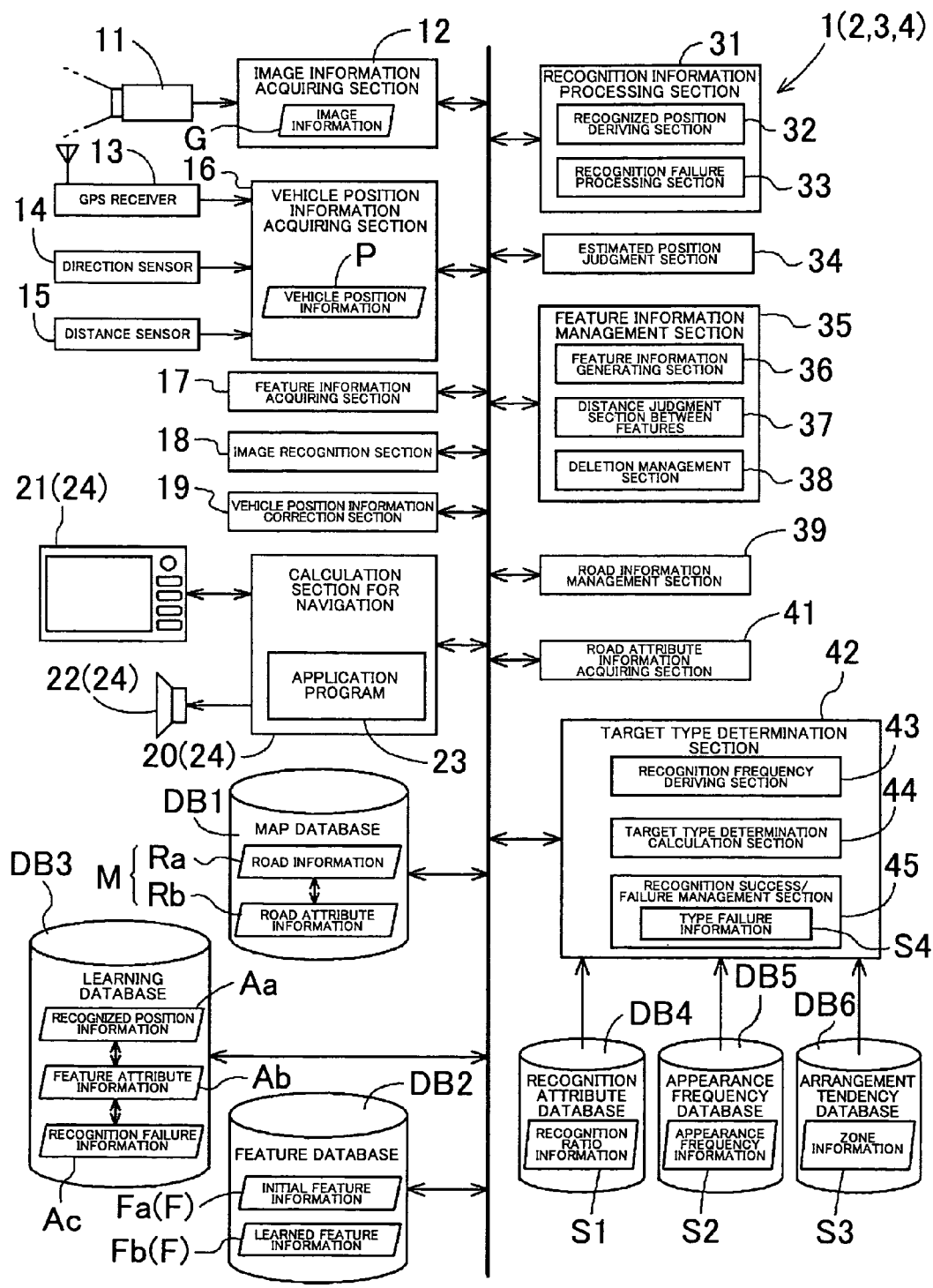
FIG. 1 is a block diagram illustrating an exemplary constitution of a navigation apparatus.

FIG. 1 is a block diagram illustrating the constitution of an exemplary navigation apparatus 1. This navigation apparatus 1 may physically, functionally, and or conceptually include a feature information collection apparatus 2, an image recognition apparatus 3, and a vehicle position recognition apparatus 4. By setting a feature of a predetermined feature type as a target feature, the navigation apparatus 1 learns the position of the target feature by using image recognition of the target feature (e.g., by an image recognition section 18). The learned position of the target feature is stored in a feature database DB2. Thus, the navigation apparatus 1 enables creation/correction of vehicle position information P using feature information F, even on a road that has not been effectively provided with the feature information F. In addition, when the navigation apparatus 1 fails in image recognition of the target feature based on the feature information F stored in the feature database DB2, the navigation apparatus 1 learns the failure. By reflecting the failure in the feature database DB2, the feature information F may be corrected. The navigation apparatus 1 may than perform navigation processing, such as route guidance, based on the corrected vehicle position information P.

Functional sections of the navigation apparatus 1 shown in FIG. 1 include specifically: an image information acquiring section 12, a vehicle position information acquiring section 16, a feature information acquiring section 17, an image recognition section 18, a vehicle position information correction section 19, a calculation section for navigation 20, a recognition information processing section 31, an estimated position judgment section 34, a feature information management section 35, a road information management section 39, a road attribute information acquiring section 41, and a target type determination section 42. These sections may be implemented by hardware or software (programs), or both, with a controller (arithmetic processing unit) such as a central processing unit (CPU) serving as a core component. Moreover, these functional sections may be constituted so as to be able to transfer information to each other. In addition, each of databases DB1 to DB6 in the navigation apparatus 1 is provided as one or more memories, such as recording medium that can store information and its drive unit, such as a hard disk drive, a DVD drive loaded with a DVD-ROM, or a CD drive loaded with a CD-ROM, as a hardware configuration. The constitutions of these sections of the navigation apparatus 1 of the present example will be described in detail below.

Figure 2:
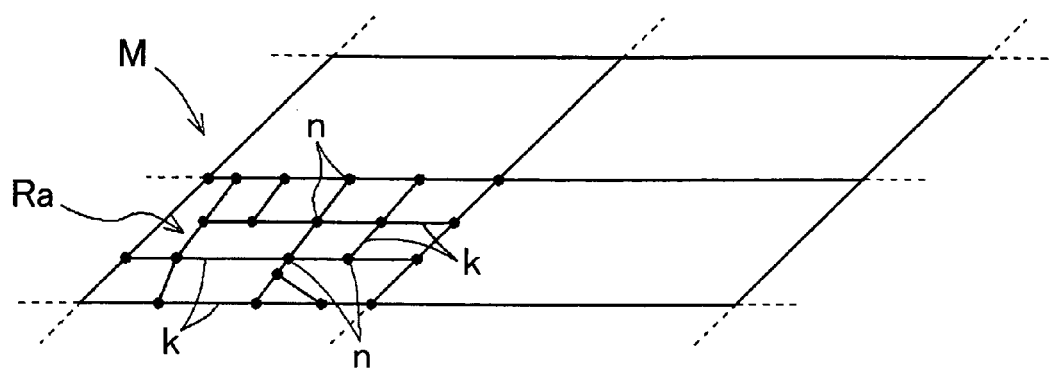
FIG. 2 is a diagram illustrating an example of map information stored in a map database.

A map database DB1 stores map information M divided into predetermined sections. FIG. 2 is a diagram illustrating an example of a constitution of the map information M stored in the map database DB1. As shown in this diagram, the map information M has road information Ra that indicates a road network, using connection relations between numerous nodes n, corresponding to intersections, and links k, corresponding to roads connecting between intersections. Each node n has information about a position (coordinate) on the map represented by latitude and longitude. The links k are connected via the nodes n. In addition, each link k, as its attribute information, has information such as road type, area type, link length, road width, and interpolation points to render the link shape. Here, the road type information is information about the road type classified by dividing roads into multiple types such as, for example, motorway, urban road, narrow road, and mountain road. The area type information is information about the area type classified by dividing areas provided with roads corresponding to the links k into multiple types such as, for example, Kanto and Kansai regions, and administrative areas, for example, prefectures, cities, wards, towns, and villages. The attribute information about these links k corresponds to road attribute information Rb (refer to FIG. 1). In the present example, the map database DB1 corresponds to a road information storage portion and a map information storage portion in the present invention. Note that, in FIG. 2, only the road information Ra in one section is shown, the road information Ra in other sections being omitted.

The feature database DB2 is a database in which information about various features provided on the road or in the neighborhood of the road, that is, the feature information F is stored. As shown in FIG. 1, in the present example, two kinds of information, that is, initial feature information Fa and learned feature information Fb are stored in the feature database DB2. Here, the initial feature information Fa is the feature information F about multiple features that have been provided and stored in the feature database DB2 in advance. Such initial feature information Fa is provided only about certain areas such as metropolitan areas and main roads, among all areas for which the map information M including the road information Ra is provided. On the other hand, as described later, the learned feature information Fb is the feature information F stored in the feature database DB2 as a result of learning using a result of image recognition of a target feature by the image recognition section 18. Note that, in the description below, a simple expression of "feature information F" collectively means the initial feature information Fa and the learned feature information Fb.

Figure 3:
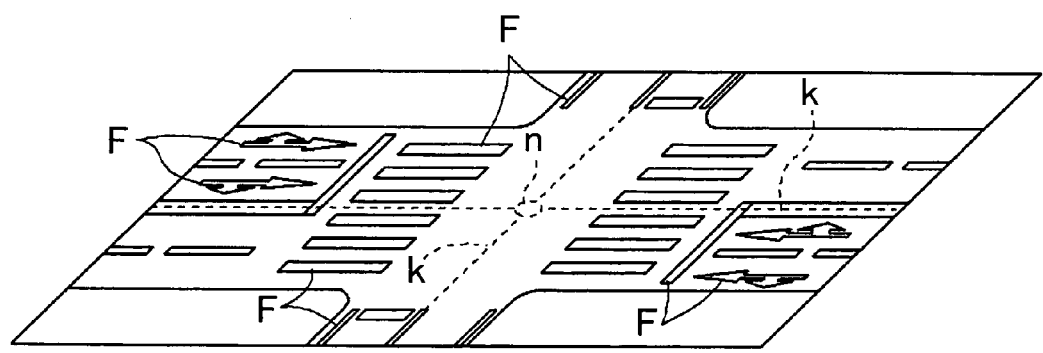
FIG. 3 is a diagram illustrating an example of feature information of road markings stored in a feature database.

The features, whose feature information F is stored in the feature database DB2, include road markings (painted markings) provided on the road surface. FIG. 3 is a diagram illustrating an example of the feature information F of road markings stored in the feature database DB2. Such features as related to road markings include, for example, pedestrian crossings, stop lines, speed markings indicating maximum speed, etc., zebra zones, carriageway lines to divide the road into lanes along the road (including various kinds of solid, dashed, and double division lines), and carriageway markings to designate traveling direction of each lane (including arrow markings such as straight arrows and right turn arrows). In addition to these road markings, the features, whose feature information F is stored, can also include various features such as traffic lights, signs, overpasses, and tunnels.

The feature information F also includes position information of each feature and feature attribute information associated with it. The position information has information about a position (coordinate) on the map of each feature's representative point associated with the link k or node n constituting the road information Ra, and also has information about direction of each feature. In the present example, the representative point is set in the vicinity of the lateral and longitudinal center of each feature. The feature attribute information includes feature type information, as well as feature pattern information such as shape, size, and color of features. Here, the feature type is specifically the information that indicates the type of features having basically the same pattern such as "pedestrian crossing," "stop line," and "speed marking (30 km/h)." In the present example, the feature information F also has association information indicating relationships with other nearby features, and distance information between features indicating the distance to another feature. The association information is information to enable prediction of another feature existing ahead, by recognizing a feature using image recognition while a vehicle 50 (refer to FIGS. 5A-5C, etc.) is traveling along the road. The distance information between features is information to accurately predict the distance from the vehicle 50 to such a feature as existing ahead.

A learning database DB3 stores in it recognized position information Aa, which has been derived by a recognized position deriving section 32, and recognition failure information Ac, which has been derived by a recognition failure processing section 33, in such a state that the target feature corresponding to each piece of recognized position information Aa and recognition failure information Ac can be identified. To enable identification of the target feature corresponding to each piece of information Aa and Ac, each pieces of information Aa and Ac, and feature attribute information Ab corresponding to them are associated with each other and stored. The specific contents of the recognized position information Aa, the feature attribute information Ab, and the recognition failure information Ac, which are stored in the learning database DB3, will be described in detail later.

Figure 4:
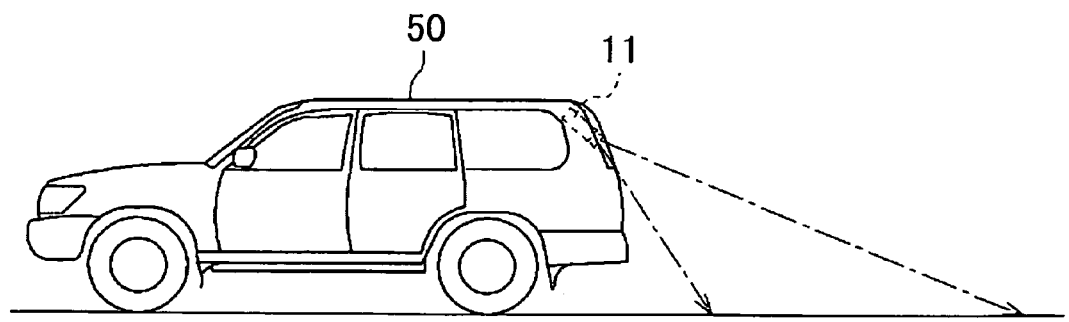
FIG. 4 is a diagram illustrating an example of an arrangement configuration of an imaging apparatus on a vehicle.

The image information acquiring section 12 functions as an image information acquiring portion for acquiring image information G in the vicinity of the vehicle taken by an imaging apparatus 11. The imaging apparatus 11 is a vehicle on-board camera or the like provided with an image pickup device and installed in a position from which the apparatus can take an image of at least the road surface in the vicinity of the vehicle 50. As the imaging apparatus 11, it is preferable to use, for example, a back camera that takes image of the road surface rearward of the vehicle 50, as shown in FIG. 4. The image information acquiring section 12 acquires image information taken by the imaging apparatus 11 at predetermined intervals through a frame memory (not shown) or the like. The time interval, of acquiring the image information G can be set to, for example, 10 ms to 50 ms. In this way, the image information acquiring section 12 can continuously acquire the image information G of multiple frames taken by the imaging apparatus 11. The image information G acquired here is sent out to the image recognition section 18.

The vehicle position information acquiring section 16 acquires vehicle position information P indicating the current position of the vehicle 50. In this case, the vehicle position information acquiring section 16 is connected to a global positioning system (GPS) receiver 13, a direction sensor 14, and a distance sensor 15. The GPS receiver 13 is a device to receive GPS signals from a GPS satellite. The GPS signals are received normally at intervals of one second, and sent out to the vehicle position information acquiring section 16. The vehicle position information acquiring section 16 can acquire information about the vehicle 50, such as a current position (latitude and longitude), orientation of travel, and traveling speed, by analyzing the signals from the GPS satellite received by the GPS receiver 13.

The direction sensor 14 is a sensor that detects an orientation or a change in orientation of travel of the vehicle 50. The direction sensor 14 includes, for example, a gyro sensor, a geomagnetic sensor, an optical rotation sensor or rotary-type resistance sensor installed on the rotating part of steering, and an angular sensor installed on a wheel. The direction sensor 14 sends its detection result to the vehicle position information acquiring section 16. The distance sensor 15 is a sensor to detect a vehicle speed and movement distance of the vehicle 50. The distance sensor 15 includes, for example, a vehicle speed pulse sensor that sends out a pulse signal at every rotation of a given angle of a vehicle drive shaft or wheel, a yaw rate and G sensor to detect an acceleration of the vehicle 50, and a circuit to integrate the detected acceleration. The distance sensor 15 sends its detection result, that is, the information about vehicle speed and movement distance, to the vehicle position information acquiring section 16.

Then, based on the outputs from the GPS receiver 13, the direction sensor 14, and the distance sensor 15, the vehicle position information acquiring section 16 performs calculation to identify the vehicle position, using a known method. The vehicle position information acquiring section 16 also acquires the road information Ra about the vicinity of the vehicle position extracted from the map database DB1, and by performing a known map matching based on the information, corrects the vehicle position so as to be situated on the road indicated by the road information Ra. In this way, the vehicle position information acquiring section 16 acquires the vehicle position information P including the information about the current position of the vehicle 50 represented by latitude and longitude, and the information about the orientation of travel of the vehicle 50.

The feature information acquiring section 17 extracts and acquires the feature information F about the features existing in the vicinity of the vehicle 50 from the feature database DB2, based on the vehicle position information P and others acquired in the vehicle position information acquiring section 16. As an example, based on the vehicle position information P, the feature information acquiring section 17 extracts, from the feature database DB2, the feature information F about the target features existing between the current position of the vehicle 50 indicated by the vehicle position information P and the end of the link k representing the road on which the vehicle 50 is traveling. Then, the acquired feature information F is sent out to the image recognition section 18 and the vehicle position information correction section 19. In the feature information F about the target features extracted from the feature database DB2 by the feature information acquiring section 17, both the initial feature information Fa and the learned feature information Fb are included. The features to be rendered as target features are features that are to be recognized by an image recognition section 5. In the present example, the target features are features of the feature types selected from various kinds of road markings, such as pedestrian crossings, stop lines, and speed markings, provided on the road surface.

The image recognition section 18 performs image recognition processing of the target feature included in the image information G acquired in the image information acquiring section 12. In the present example, the image recognition section 18 performs two kinds of image recognition processing: (1) image recognition processing for position correction to be used for correcting the vehicle position information P, and (2) image recognition processing for information collection to be used for learning the image recognition result of the target feature and reflecting the result in the feature database DB2.

In the present example, the image recognition section 18 refers to the feature information F that has been acquired from the feature database DB2 based on the vehicle position information P. Then, the image recognition section 18 performs the image recognition processing for position correction if the target feature stored as the feature information F is judged to exist in the vicinity of the vehicle 50, or performs the image recognition processing for information collection if the target feature stored as the feature information F is judged not to exist in the vicinity of the vehicle 50.

The purpose, as described later, is as follows: When the vehicle 50 is traveling on a road already provided with the feature information F, the image recognition section 18 corrects the vehicle position information P based on the result of image recognition by the image recognition processing for position correction and on the feature information F, or it modifies the feature information F if it has failed in the image recognition processing for position correction. When the vehicle 50 is traveling on a road not provided with the feature information F, the image recognition section 18 learns the position in which the target feature exists using the result of the image recognition processing for information collection. In the present example, the judgment of whether the target feature stored as the feature information F exists in the vicinity of the vehicle 50 is performed by checking whether the target feature stored as the feature information F exists between the current position of the vehicle 50 (vehicle position) indicated by the vehicle position information P and the end of the link k representing the road on which the vehicle 50 is traveling.

In the image recognition processing for position correction, based on the feature information F, which has been acquired from the feature database DB2 based on the vehicle position information P, of the target feature existing in the vicinity of the vehicle 50, the image recognition section 18 performs image recognition processing of the target feature indicated by the feature information F included in the image information G. In this case, the image recognition section 18 sets a predefined recognition area E (refer to FIGS. 6A-6C) in which the target feature indicated by the feature information F is requested to be recognized, and performs image recognition of the target feature with respect to the image information G in the recognition area E. The recognition area E is set as a position range, on the link k indicated by the road information Ra, in which the target feature is presumed to exist. The image-taking area of actual road included in each piece of image information G can be obtained based on the vehicle position information P, using the positional relation between the vehicle position and the image-taking area that has been calculated in advance based on the installation position and installation angle, and viewing angle, etc. of the imaging apparatus 11 on the vehicle 50.

As a result, based on the thus obtained information about the image-taking area of each piece of image information G, the image recognition section 18 extracts the image information G corresponding to the recognition area E that is set for each target feature, and performs image recognition processing. Then, the result of image recognition of the target feature by the image recognition processing for position correction is used for correction of the vehicle position information P by the vehicle position information correction section 19. In the image recognition processing for position correction, the image recognition section 18 also performs image recognition of the target feature outside the recognition area E set for each target feature. Such a result of image recognition of the target feature recognized outside the recognition area E is not used for correction of the vehicle position information P, but used for modification of the feature information F, as described later.

In the image recognition processing for information collection, setting as targets the features of the target types determined by a target type determination section 42 described later, the image recognition section 18 performs image recognition processing of the target feature included in the image information G. This image recognition processing cannot estimate the position in which the target feature exists because the processing is performed without using the feature information F stored in the feature database DB2. Therefore, in this image recognition processing for information collection, in response to determination of target types for each predefined road zone Z (refer to FIGS. 9A-10B) by the target type determination section 42, the image recognition section 18 performs image recognition processing of the target features of the target types determined for the road zone Z, with respect to each road zone Z.

The road zone Z is a zone that is set on the node n and the link k indicated by the road information Ra. Depending on the road attribute of each road (link k), the road zone Z is set, for example, as end of link Za or middle of link Zb shown in FIG. 9A, or as on node Zc or on link Zd shown in FIG. 10A. As described above, the image-taking area of actual road included in each piece of image information G can be obtained based on the vehicle position information P, using the positional relation between the vehicle position and the image-taking area that has been calculated in advance based on the installation position and installation angle, and viewing angle, etc. of the imaging apparatus 11 on the vehicle 50.

As a result, based on the thus obtained information about the image-taking area of each piece of image information G, the image recognition section 18 extracts the image information G corresponding to each road zone Z, and performs image recognition processing of the target features of the target types determined for the road zone Z. Then, the result of image recognition of the target feature by the image recognition processing for information collection is rendered to be the recognized position information by the recognized position deriving section 32 as described later, and stored in the learning database DB3.

When performing image recognition of the target feature, the image recognition section 18 applies binary processing or edge detection processing to the image information G, and extracts contour information of the feature (road marking) included in the image information G. After that, by applying pattern matching between the extracted contour information of the feature and the feature quantity of the pattern of the target feature, the image recognition section 18 extracts the image of the target feature included in the image information G. Then, when performing the image recognition processing for position correction, the image recognition section 18 judges that it has succeeded in image recognition of the target feature if it has been able to extract the image of the target feature from the image information G inside the area set as the recognition area E. When performing the image recognition processing for information collection, the image recognition section 18 judges that it has succeeded in image recognition of the target feature if it has been able to extract the image of the target feature from the image information G in each road zone Z. On the other hand, as a result of image recognition processing of all pieces of the image information G in the recognition area E or in each road zone Z, if the image recognition section 18 has not been able to extract the image of the target feature, it judges that the image recognition of the target feature has failed.

The vehicle position information correction section 19 corrects the vehicle position information P based on the result of image recognition processing of the target feature by the image recognition section 18 and on the position information of the target feature included in the feature information F about the target feature. In the present example, the vehicle position information correction section 19 corrects the vehicle position information P along the traveling direction of the vehicle 50, using the result of image recognition of the target feature by the image recognition processing for position correction based on the feature information F in the image recognition section 18, and also using the position information of the target feature included in the feature information F.

Specifically, based on the result of the image recognition processing for position correction by the image recognition section 18 and on the installation position, installation angle, and viewing angle of the imaging apparatus 11, the vehicle position information correction section 19 first calculates the positional relation between the vehicle 50 and the target feature at the time of acquisition of the image information G including the image of the target feature. Next, based on the above calculation result of the positional relation between the vehicle 50 and the target feature and on the position information of the target feature included in the feature information F about the target feature, the vehicle position information correction section 19 calculates and acquires the high-accuracy position information about the vehicle 50 on the basis of the position information of the target feature (feature information F) in the traveling direction of the vehicle 50. Then, based on the thus acquired high-accuracy position information about the vehicle 50, the vehicle position information correction section 19 corrects the information about the current position in the traveling direction of the vehicle 50 included in the vehicle position information P, which has been acquired in the vehicle position information acquiring section 16. As a result, the vehicle position information acquiring section 16 acquires the high-accuracy vehicle position information P after the above correction.

The calculation section for navigation 20 operates according to an application program 23 to perform navigation functions such as vehicle position display, route search from a starting point to a destination, course guidance to a destination, and destination search. For example, the calculation section for navigation 20 acquires, based on the vehicle position information P, the map information M about the vicinity of the vehicle 50 from the map database DB1, and displays the image of the map on a display and input device 21, while superimposing, based on the vehicle position information P, a vehicle position mark on the image of the map. In addition, based on the map information M stored in the map database DB1, the calculation section for navigation 20 performs route search from a predefined starting point to a destination. Based on the searched route from the starting point to the destination and on the vehicle position information P, the calculation section for navigation 20 performs course guidance for the driver, using the display and input device 21, or a speech output device 22, or both. In the present example, the calculation section for navigation 20 is connected to the display and input device 21, and the speech output device 22. The display and input device 21 is a combination of a display device such as a liquid crystal display device, and an input device such as a touch screen. The speech output device 22 includes a speaker, etc. In the present example, the calculation section for navigation 20, the display and input device 21, and the speech output device 22 function as a guidance information output portion 24 in the present invention.

The recognition information processing section 31 stores into the learning database DB3 the information indicating the result of image recognition processing by the image recognition section 18, that is, specifically the recognized position information derived by the recognized position deriving section 32 and the recognition failure information generated by the recognition failure processing section 33. Therefore, in the present example, the recognition information processing section 31 is provided with the recognized position deriving section 32 and the recognition failure processing section 33. The details of processing performed by the recognized position deriving section 32 and the recognition failure processing section 33 will be described below, with reference to FIGS. 5-8.

The recognized position deriving section 32 derives the recognized position of the target feature based on the vehicle position information P, when the image recognition processing by the image recognition section 18 has succeeded in image recognition of the target feature. The recognized position deriving section 32 also generates the recognized position information Aa indicating the recognized position that has been derived, and stores the information into the learning database DB3 in such a state that the target feature successfully recognized by the image recognition can be identified. FIGS. 5A-5C is an explanatory diagram for explaining an outline of collection processing of the feature information F using the result of the image recognition processing for information collection, in the case, for example, that the vehicle 50 travels on the road (link k) in which the feature information F is not provided. FIG. 5A shows an example of road markings (features) provided on an actual road on which the vehicle 50 travels. FIG. 5B shows an example of the recognized position information Aa stored in the learning database DB3. FIG. 5C shows an example of the feature database DB2 in which the learning result stored in the learning database DB3 is reflected. For simplifying the description, FIG. 5 shows an example in which the feature types are the same "pedestrian crossing" in all illustrated areas, unlike FIGS. 9A-10B in which the feature types differ among the predefined road zones Z (Za to Zd).

In the present example, as shown in FIG. 5B, the recognized position deriving section 32 generates the recognized position information Aa for each target feature as a learning value with respect to the predefined position range to which the recognized position of the target feature recognized by the image recognition section 18 belongs. Then, the recognized position deriving section 32 increments the learning value for each of the position range every time when the target feature is recognized, and stores the result. The contents of processing by the recognized position deriving section 32 will be described in sequence below, using FIGS. 5A and 5B.

When the image recognition section 18 applies the image recognition processing for information collection to the target features of the target types determined by the target type determination section 42, the recognized position deriving section 32 first monitors whether the image recognition of the target feature is successful. In the present example, the image recognition processing for information collection is applied to the target features that include all features whose feature type is "pedestrian crossing." Therefore, in the example shown in FIG. 5A, the vehicle 50 should recognize, as target features, the images of the pedestrian crossings f1 to f4 at four locations along the traveling direction.

Then, when the image recognition section 18 has succeeded in image recognition of a target feature, the recognized position deriving section 32 derives the recognized position of the target feature, based on the image recognition result. The recognized position deriving section 32 derives the recognized position of the target feature as information indicating the position on the road of the target feature on the basis of the vehicle position information P. Consequently, the recognized position deriving section 32 calculates the positional relation between the vehicle 50 and the target feature at the time of acquisition of the image information G including the image of the target feature, based on the result of image recognition of the target feature by the image recognition section 18, and on the installation position, installation angle, and viewing angle of the imaging apparatus 11.

Next, based on the calculation result of the positional relation between the vehicle 50 and the target feature and on the vehicle position information P at the time of acquisition of the image information G, the vehicle position information correction section 19 calculates the position of the target feature on the basis of the vehicle position information P. In the present example, the recognized position deriving section 32 obtains the position of the target feature as a position of the representative point along the link k representing the road on which the vehicle 50 is traveling. Then the recognized position deriving section 32 derives the thus calculated position of the target feature, as a recognized position of the target feature. Because this recognized position of the target feature is derived on the basis of the vehicle position information P at the time of acquisition of the image information G including the image of the target feature, the recognized position is information about the position in which the error in the vehicle position information P is reflected.

The recognized position deriving section 32 renders the recognized position of the target feature as a learning value with respect to the predefined position range, and the learning value with respect to the position range as the recognized position information Aa. In the present example, the predefined position range is a range that is set by dividing the link k representing a road at constant intervals of distance, that is, for example, a range made by dividing the link k at intervals of 0.5 m. The learning value is a value that is incremented with respect to the position range to which the recognized position of the target feature in the learning database DB3 belongs, every time when image recognition of one target feature is made successfully. For example, the learning value is incremented by one, every time when image recognition of one target feature is made successfully. In other words, in the present example, the recognized position information Aa includes the information indicating the position range including the recognized position of the target feature, and the information of the learning value "1."

Figure 7:
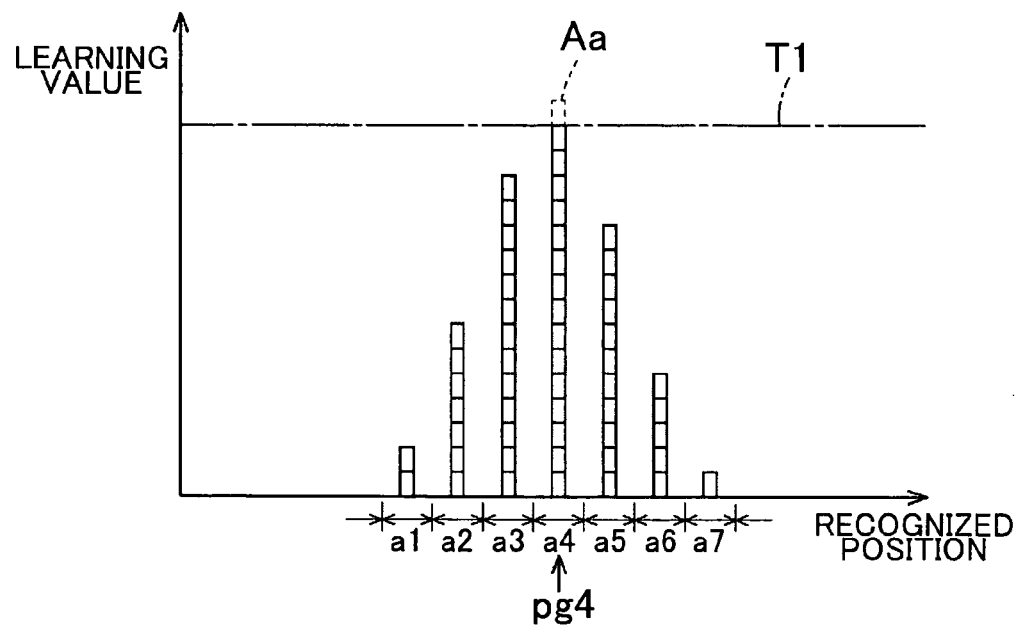
FIG. 7 is an enlarged diagram of an essential part of FIG. 5B showing learning values stored in a learning database.

FIG. 7 is an enlarged diagram of the part about the pedestrian crossing f1 of FIG. 5B showing the learning values stored in the learning database DB3. For example, in the example shown in FIG. 5A, if an image of the pedestrian crossing f1 as a target feature is successfully recognized, and also if the recognized position of the pedestrian crossing f1 derived by the recognized position deriving section 32 is located in the position range indicated as "a4" in FIG. 7, a value of 1 is added to the learning value for the position range a4, as the dashed lines show in FIG. 7. Further, when the image of the same target feature (for example, the pedestrian crossing f1) is recognized multiple times because the vehicle 50 passes through the same road multiple times, in the learning database DB3, the learning values as the multiple pieces of the recognized position information Aa, which is generated every time when the target feature is recognized, are summed and accumulated for each position range indicating the recognized position of the target feature, as shown in FIG. 5B and FIG. 7. Then, as described later, when a learning value reaches a predefined learning threshold value T1 or more, the learned feature information Fb about the target feature is generated by a feature information generating section 36, and stored into the feature database DB2. In the example of FIG. 5, as shown in FIG. 5C, learned feature information items Fb1 to Fb4 corresponding to the pedestrian crossings f1 to f4 are stored in the feature database DB2.

In addition, in the case of the image recognition processing for position correction by the image recognition section 18, when an image of the target feature is recognized outside the recognition area E, which has been set with respect to each target feature, the recognized position deriving section 32 performs the same processing as the processing that uses, to collect the feature information F, the result of the above-described image recognition processing for information collection. In other words, the recognized position deriving section 32 derives the recognized position of the target feature on the basis of the vehicle position information P, based on the result of image recognition of the target feature by the image recognition processing for position correction. Then, the recognized position deriving section 32 generates the recognized position information Aa indicating the recognized position that has been derived, and stores the information into the learning database DB3 in such a state that the target feature successfully recognized by the image recognition can be identified.

In this way, as described later, the feature information F stored in the feature database DB2 can be modified, using the result of image recognition of the target feature in the image recognition processing for position correction. For details about the processing by the recognized position deriving section 32 when the image of the target feature is recognized outside the recognition area E that has been set in the image recognition processing for position correction as described above, the description will be made later using the example shown in FIGS. 6A-6C.

To make the target feature that has been successfully recognized by the image recognition identifiable among other target features, the recognized position deriving section 32 stores the generated recognized position information Aa in association with the feature attribute information Ab, which indicates various attributes of the target feature. The attributes included in the feature attribute information Ab may only be those with which the one target feature can be distinguished from other target features. Therefore, for example, the feature attribute information Ab is provided with one or two or more items of information that are selected from the feature type of the target feature, the specific shape and size of the target feature, the link ID of the link k on which the target feature exists, and the approximate position of the target feature, etc. The above information items constituting the feature attribute information Ab about the target feature are generated based on information such as the result of image recognition of the target feature by the image recognition section 18 and the vehicle position information P at the time of acquisition of the image information G related to the image recognition processing.

When, during image recognition processing for position correction, the image recognition section 18 has failed in image recognition of the target feature indicated by the feature information F, the recognition failure processing section 33 generates the recognition failure information Ac, which indicates that the image recognition of the target feature indicated by the feature information F has failed, and stores the information into the learning database DB3 in such a state that the target feature that has failed to be recognized by the image recognition can be identified. In other words, the recognition failure processing section 33 functions as a recognition failure processing portion to perform recognition failure processing such as generating the recognition failure information Ac and storing it into the learning database DB3, as described above.

FIG. 6 is an explanatory diagram for explaining an outline of modification processing of the feature information F using the result of image recognition processing for position correction, in the case, for example, that the vehicle 50 travels on the road (link k) in which the feature information F is already provided. FIG. 6A shows an example of road markings (features) provided on an actual road on which the vehicle 50 travels. FIG. 6B is an example showing the recognized position information Aa and the recognition failure information Ac, which are stored in the learning database DB3. FIG. 6C shows an example of the feature database DB2 in which the learning result stored in the learning database DB3 is reflected. FIGS. 6A-6C show an example in which the image recognition processing for position correction is applied to the four "pedestrian crossings" as target features indicated by initial feature information items Fa11 to Fa14 shown in FIG. 6C.

In the present example, as shown in FIG. 6B, the recognition failure processing section 33 generates the recognition failure information Ac for each target feature as a learning value with respect to the target feature. Then, the recognition failure processing section 33 decrements the learning value with respect to the target feature every time when the image of the target feature fails to be recognized, and stores the result. The contents of processing by the recognition failure processing section 33 will be described in sequence below, using FIGS. 6A to 6C.

When the image recognition section 18 applies image recognition processing for position correction to the target feature indicated by the feature information F, the recognition failure processing section 33 first monitors whether the image recognition of the target feature is successful in the predefined recognition area E, which has been set with respect to the target feature. In the present example, when the vehicle 50 travels on the road (link k) provided with the initial feature information Fa, image recognition is requested in the image recognition section 18 to recognize sequentially the four "pedestrian crossings" indicated by the initial feature information items Fa11 to Fa14, as target features. However, as shown in FIG. 6A, the pedestrian crossing f12 indicated by the initial feature information item Fa12 is blurring and fading, and the pedestrian crossing indicated by the initial feature information item Fa13 has completely disappeared, in the present example. Therefore, for the blurring pedestrian crossing f12, an example in which image recognition fails at a certain percentage of times will be described, and for the pedestrian crossing indicated by the initial feature information item Fa13, which has completely disappeared, an example in which image recognition fails every time will be described.

When the image recognition section 18 applies image recognition processing for position correction to the target feature indicated by the feature information F, the recognition failure processing section 33 monitors also whether the image of the target feature is recognized outside the recognition area E, which has been set with respect to each target feature. In the present example, a pedestrian crossing f5 that is not provided as the initial feature information Fa is placed outside the recognition area E13, which has been set with respect to the target feature (pedestrian crossing) indicated by the initial feature information item Fa13, and the image of this pedestrian crossing f5 is recognized.

In addition, in the present example, an initial value Td of the learning value with respect to the target feature indicated by each item of the initial feature information Fa is set corresponding to each item of the initial feature information Fa, which has been prepared and stored in the feature database DB2 in advance, and the initial value Td is stored in the learning database DB3. In the example shown in FIG. 6B, the initial value Td of the learning value is set to a lower value than the learning threshold value T1. Then, when the image of the target feature indicated by the initial feature information Fa fails to be recognized, the recognition failure processing section 33 generates the recognition failure information Ac for the target feature as a learning value with respect to the target feature. Then, every time the image of the target feature fails to be recognized, the recognition failure processing section 33 decrements the learning value with respect to the target feature, which is stored in the learning database DB3, in a sequence starting from the initial value Td, and stores the result. In this case, for example, the learning value is decremented by one, every time when image recognition of the target feature fails. In other words, in the present example, the recognition failure information Ac includes the information with which the target feature indicated by the initial feature information Fa or the initial feature information Fa itself can be identified, and the information of the learning value "1."

To make the target feature that has failed to be recognized by the image recognition identifiable among other target features, both the initial value Td of the learning value stored in the learning database DB3 and the recognition failure information Ac generated by the recognition failure processing section 33 are stored in association with the feature attribute information Ab, which indicates various attributes of the target feature. The feature attribute information Ab mentioned above is the same information as the information that is stored in association with the recognized position information Aa.

Figure 8:
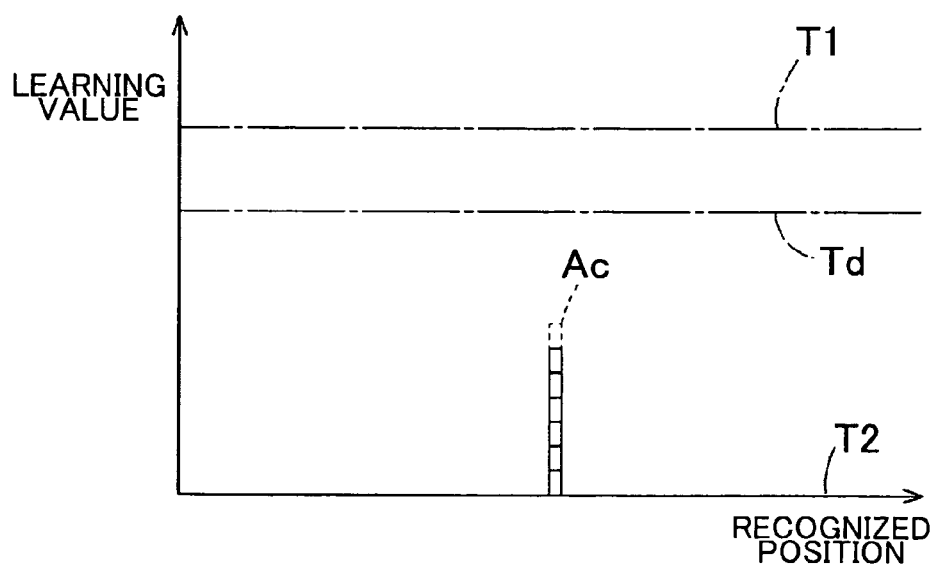
FIG. 8 is an enlarged diagram of an essential part of FIG. 6B showing learning values stored in a learning database.

FIG. 8 is an enlarged diagram of the part about the pedestrian crossing f12 (initial feature information item Fa12) of FIG. 6B showing the learning values stored in the learning database DB3. For example, in the example shown in FIG. 6A, if the image of the pedestrian crossing f12 as a target feature indicated by the initial feature information item Fa12 fails to be recognized, a value of 1 is subtracted from the learning value for the target feature, as the dashed lines show in FIG. 8. Further, if the image of the same target feature fails to be recognized multiple times when the vehicle 50 passes through the same road multiple times, the learning value decreases until it eventually becomes zero, like, for example, the learning value for the pedestrian crossing f13 indicated by the initial feature information item Fa13 in FIG. 6B. Then, in the present example, as described later, when the learning value becomes zero, the initial feature information Fa indicating the target feature is deleted from the feature database DB2 by a deletion management section 38, because a deletion threshold value T2 is set to zero. In the example shown by FIG. 6, the initial feature information item Fa13 is deleted from the feature database DB2 because the learning value for the pedestrian crossing f13 indicated by the initial feature information item Fa13 has become zero.

In the present example, even if the recognition failure processing section 33 fails in image recognition of the target feature indicated by the learned feature information Fb when performing the image recognition processing for position correction, it does not store the recognition failure information Ac about the target feature into the learning database DB3. However, it is possible to have a constitution in which, when learned feature information Fb is newly generated and stored into the feature database DB2, an initial value Td of the learning value is set for the learned feature information Fb in the same way as for the initial feature information Fa, and, instead of the past learning value as the recognized position information Aa, the initial value Td of the learning value is stored into the learning database DB3. In this case, when the image of the target feature indicated by the learned feature information Fb fails to be recognized, the recognition failure processing section 33 generates the recognition failure information Ac for the target feature as a learning value with respect to the target feature. Then, every time when the image of the target feature fails to be recognized, the recognition failure processing section 33 decrements the learning value with respect to the target feature, which is stored in the learning database DB3, in a sequence starting from the initial value Td, and stores the result. By this method, the learned feature information Fb can be treated in the same way as the initial feature information Fa.

On the other hand, when, in its image recognition processing for position correction, the image recognition section 18 has succeeded in image recognition of the target feature indicated by the feature information F inside the predefined recognition area E that has been set for the target feature, the recognition failure processing section 33 does not store the learning value as the recognition failure information Ac. In the example shown in FIG. 6, because the images of the pedestrian crossings f11 and f14 indicated by the initial feature information items Fa11 and Fa14, respectively, are successfully recognized, the learning values for the pedestrian crossings f11 and f14 stored in the learning database DB3 are maintained intact at the initial value Td, as shown in FIG. 6B.

When the image recognition processing for position correction is performed, the recognition failure processing section 33 judges whether the image of the target feature is recognized outside the recognition area E that has been set for each target feature. If the image of the target feature is recognized outside the recognition area E that has been set for each target feature, the recognized position deriving section 32 performs the same processing as the processing that uses, to collect the feature information F, the result of the image recognition processing for information collection, as described above. In other words, the recognized position deriving section 32 derives the recognized position of the target feature on the basis of the vehicle position information P, based on the result of image recognition of the target feature by the image recognition processing for position correction. Then, the recognized position deriving section 32 generates the recognized position information Aa indicating the recognized position that has been derived, and stores the information into the learning database DB3 in such a state that the target feature successfully recognized by the image recognition can be identified.

In the example shown in FIGS. 6A-6C, the pedestrian crossing f5 for which the initial feature information Fa is not provided is placed at the nearer side along the traveling direction of the vehicle 50 than the recognition area E13 that has been set for the target feature (pedestrian crossing) indicated by the initial feature information item Fa13. Therefore, in the present example, this pedestrian crossing f5 is the target feature whose image is recognized outside the recognition area E that has been set for each target feature. In this case, the recognized position deriving section 32, instead of the recognition failure processing section 33, performs the same processing as the processing that uses, to collect the feature information F, the result of the image recognition processing for information collection. In other words, every time when the image of the pedestrian crossing f5 is successfully recognized, the recognized position deriving section 32 increments the learning value as the recognized position information Aa about the pedestrian crossing f5, with respect to the position range to which the recognized position of the pedestrian crossing f5 in the learning database DB3 belongs.

When the image of the pedestrian crossing f5 is recognized multiple times because the vehicle 50 passes through the same road multiple times, the learning values as the multiple pieces of the recognized position information Aa, which is generated every time when the pedestrian crossing f5 is recognized, are summed and accumulated in the learning database DB3, as shown in FIG. 6B. When the learning value for this pedestrian crossing f5 reaches the predefined learning threshold value T1 or more, an estimated position pg is judged by the estimated position judgment section 34. Then, as shown in FIG. 6C, the feature information generating section 36 generates the learned feature information item Fb5, and stores it into the feature database DB2. According to the constitution of the present example, the feature information F stored in the feature database DB2 can be modified appropriately in accordance with the current status, by deleting the initial feature information Fa from the feature database DB2 and by adding the learned feature information Fb to the feature database DB2, as described above.

To make the target feature that has failed to be recognized by the image recognition identifiable among other target features, the recognition failure processing section 33 also stores the generated recognition failure information Ac in association with the feature attribute information Ab, which indicates various attributes of the target feature. The feature attribute information Ab mentioned above is the same information as the information that is stored in association with the recognized position information Aa.

The estimated position judgment section 34 functions as an estimated position judgment portion to judge the estimated position pg of the target feature (refer to FIGS. 5A-5C), based on the multiple pieces of the recognized position information Aa about the same target feature, which have been stored in the learning database DB3 as a result of multiple times of image recognition of the same target feature. Based on a distribution of the multiple pieces of the recognized position information Aa about the same target feature, the estimated position judgment section 34 judges the representative value of the distribution to be the estimated position pg of the target feature.

In the present example, a mode value is used as a representative value of the distribution. In other words, when a learning value as the recognized position information Aa about each target feature first reaches the predefined learning threshold value T1 or more, the position representing the position range that contains the learning value is judged to be the estimated position pg of the target feature, by the estimated position judgment section 34. Accordingly, when judging the estimated position pg with respect to one target feature, the estimated position judgment section 34 judges the position representing the position range that has a mode value to be the estimated position pg of the target feature, based on the distribution of the learning values as the recognized position information Aa about the target feature stored in the learning database DB3. As an example, a judgment method is described in the case of judging the estimated position pg of the pedestrian crossing f1 in the example shown in FIGS. 5A-5C. As shown in FIG. 7, the learning value as the recognized position information Aa about the pedestrian crossing f1 first reaches the learning threshold value T1 or more in the position range a4. Therefore, the estimated position judgment section 34 judges the position representing the position range a4, for example, the center position pg4 of the position range a4, to be the estimated position pg of the pedestrian crossing f1.

The feature information management section 35 manages the feature information F stored in the feature database DB2, based on the result of learning of the target feature stored in the learning database DB3. In the present example, the feature information management section 35 includes the feature information generating section 36, a distance between features judgment section 37, and the deletion management section 38. These sections will be described individually below.

The feature information generating section 36 generates the learned feature information Fb, based on the result of learning of the target feature stored in the learning database DB3. In other words, the feature information generating section 36 generates the learned feature information Fb that associates the position information indicating the estimated position pg of each target feature judged by the estimated position judgment section 34 with the feature attribute information based on the image recognition result of the target feature recognized by the image recognition section 18. The feature attribute information constituting the learned feature information Fb is generated using the content of the feature attribute information Ab, which is stored in the learning database DB3 in association with the recognized position information Aa about the target feature.

Accordingly, in the same way as the initial feature information Fa, the learned feature information Fb is generated as information provided with the position information and the feature attribute information associated with it. Then, the learned feature information Fb generated in the feature information generating section 36 is stored into the feature database DB2. In the present example, the learned feature information items Fb1 to Fb4 shown in FIG. 5C, and the learned feature information item Fb5 shown in FIG. 6C are generated by the feature information generating section 36, and stored in the feature database DB2. Note that the black square "■" shown in these diagrams represents the estimated position pg of each target feature indicated by the position information of each of the learned feature information items Fb1 to Fb5.

The distance between features judgment section 37 judges a distance between features D that indicates a distance between two target features, based on the multiple pieces of the recognized position information Aa about the two target features. In the present example, the distance judgment section between features 37, using the information about the estimated positions pg of two target features judged by the estimated position judgment section 34, calculates the distance between the estimated position pg of one target feature and the estimated position pg of the other target feature to obtain the distance between features D of the two target features. In the example shown in FIG. 5B, the distance between features judgment section 37 obtains the distance between two neighboring target features. Specifically, in this example, the distance between features judgment section 37 judges and obtains distance between features D1 between the pedestrian crossings f1 and f2, distance between features D2 between the pedestrian crossings f2 and f3, and distance between features D3 between the pedestrian crossings f3 and f4. The information about the distance between features D judged by the distance between features judgment section 37 is used as information that constitutes the learned feature information Fb, which is generated by the above-described feature information generating section 36. In other words, in the present example, the learned feature information Fb about each target feature is generated as information that includes the associated information indicating the relation between the target feature and the other neighboring feature, and also includes the distance information between features indicating the distance between features D between the target feature and the other feature. These items of information have the same contents as the associated information and the distance information between features, which are included in the initial feature information Fa.

The deletion management section 38 deletes the feature information F stored in the feature database DB2, based on the result of learning of the target feature stored in the learning database DB3. In other words, the deletion management section 38 deletes the feature information F about the target feature stored in the feature database DB2, based on the multiple pieces of the recognition failure information Ac about the same target feature, which have been stored in the learning database DB3 as a result of multiple times of image recognition of the same target feature. Specifically, when the learning value for each target feature becomes the predefined deletion threshold value T2 or less, the deletion management section 38 deletes the feature information F about the target feature. As described above, in the present example, the deletion threshold value T2 is set to zero. Therefore, when the learning value as the recognition failure information Ac, which is stored in the learning database DB3, with respect to one target feature becomes zero, the deletion management section 38 deletes the feature information F about the target feature from the feature database. DB2.

In the present example, because the recognition failure information Ac related to the learned feature information Fb is not stored in the learning database DB3, the deletion management section 38 performs only the deletion processing related to the initial feature information Fa, from the feature database DB2. In the example shown in FIGS. 6A-6C, the deletion management section 38 deletes the initial feature information item Fa13 from the feature database DB2, when the learning value for the pedestrian crossing f13 indicated by the initial feature information item Fa13 becomes zero. In a constitution, as described above, in which, similarly to the initial feature information Fa, the recognition failure information Ac related to the learned feature information Fb is also stored in the learning database DB3, the deletion management section 38 performs also the deletion processing related to the learned feature information Fb, from the feature database DB2.

The road information management section 39 modifies either or both of the road information Ra and the road attribute information Rb, which are stored in the map database DB1. In the present example, the road information management section 39 modifies either or both of the position information of the node n and the length information of the link k connecting the two nodes n, both information items being included in the road information Ra. In this case, the road information management section 39 determines either or both of the position of the node n and the length of the link k, based on the position information indicating the estimated positions pg, which have been judged by the estimated position judgment section 34, of two target features placed on the opposite sides of and at approximately equal distance from the node n. The target features placed on the opposite sides of and at approximately equal distance from the node n correspond to, for example, pedestrian crossings.

In other words, because pedestrian crossings are provided at the boundary areas between an intersection and roads, they are generally placed on the opposite sides of and at approximately equal distance from the node n representing the center of the intersection. Therefore, as shown, for example, in FIG. 5B, once, based on the recognized position information Aa stored in the learning database DB3, the estimated positions pg of two pedestrian crossings existing in the vicinity of the node n are obtained by the estimated position judgment section 34, the middle position with an equal space d from the estimated positions pg of the two pedestrian crossings can be estimated as a node position pn in which the node n is located. In the same way, if the node position pn of a node n located at the end of the link k on the opposite side of the above-described node n has been able to be obtained, the distance between the two node positions pn can be estimated as corresponding to the link length L. Then, if the node positions pn and the link length L thus obtained differ from those indicated by the road information Ra stored in the map database DB1, the road information management section 39 modifies the road information Ra in accordance with the obtained data. In this way, the road information Ra stored in the map database DB1 can be modified appropriately in accordance with the current status, by using the result of learning of the target features.

The road attribute information acquiring section 41 acquires from the map database DB1 the road attribute information Rb about the road (link k) on which the vehicle 50 is traveling, based on the vehicle position information P. As described above, the road attribute information Rb stored in the map database DB1 includes information such as road type, area type, link length, road width, and interpolation points to render the link shape. The road attribute information acquiring section 41 selects from the above-mentioned items the information items required for determination of the target types by the target type determination section 42 (described later) and acquires them as the road attribute information Rb, from the map database DB1. In the present example, the road attribute information acquiring section 41 acquires the road type information and the area type information as the road attribute information Rb. As described above, the road type information is information about the road type classified by dividing roads into multiple types such as, for example, motorway, urban road, narrow road, and mountain road. The area type information is information about the area type classified by dividing areas provided with roads corresponding to the links k into multiple types such as, for example, Kanto and Kansai regions, and administrative areas, for example, prefectures, cities, wards, towns, and villages. Therefore, as the road attribute information Rb about the road (link k) on which the vehicle 50 is traveling, the road attribute information acquiring section 41 acquires information such as, for example, "road type: urban road, area type: Aichi Prefecture."

A recognition attribute database DB4 is a database in which is stored recognition ratio information S1 as recognition attribute information about all feature types that can be target types, and functions as a recognition attribute information storage portion. The recognition ratio information S1 is information indicating, in the case of the image recognition processing for information collection by the image recognition section 18, the predicted recognition ratio of a feature of each feature type, the predicted recognition ratio being determined based on the properties inherent in each feature type. In other words, the recognition ratio information S1 is information that indicates a theoretical ratio of success in recognizing the image of a target feature of each feature type. The properties inherent in each feature type that affect the recognition ratio of each feature type include, for example, the shape, size, color, or likelihood of blurring of each feature type.

For example, with regard to the shape of a feature, if a feature type has a distinguishing shape that is unlikely to be mistaken for other feature type and easy to be recognized, its recognition ratio tends to be high. With regard to the size of a feature, the larger in the direction of road width a feature is, the higher its possibility to be included in the image information G is, when taken by the imaging apparatus 11. Thus, its recognition ratio tends to be high. With regard to the color of a feature, the larger its contrast to the color of the road surface is, the higher its recognition ratio tends to be. With regard to the likelihood of blurring of a feature, the higher the possibility of blurring is, the higher the possibility of failure in image recognition is; thus, its recognition ratio tends to be low. The likelihood of blurring of each feature type is obtained statistically, based on the result of field research about what percentage of features of each feature type is blurring. Then, the recognition ratio information S1 of each feature type, which is stored into the recognition attribute database DB4, becomes the information indicating the predicted values of recognition ratio, which are predefined based on the properties inherent in each of these feature types.

An appearance frequency database DB5 is a database in which is stored appearance frequency information S2 about all feature types that can be target types, indicating the appearance frequency of each feature type depending on the road attribute indicated by the road attribute information Rb, and functions as an appearance frequency information storage portion. The appearance frequency information S2 is information indicating the appearance frequency of each feature type on each road (link k) of the multiple road attributes indicated by the road attribute information Rb. In the present example, as described above, the road type information and the area type information are used as the road attribute information Rb. Therefore, the appearance frequency information S2 of each feature type about all combinations of the road type information and the area type information is defined in the appearance frequency database DB5. The appearance frequency of each feature type depending on the road attribute as described above is obtained statistically, based on the result of field research about feature types of features existing on the road of each road attribute. The appearance frequency information S2, in the present example, is information represented by the number of appearing features of each feature type per unit length of road, and more specifically, it is information represented by the number of appearance per road length of 1 km. Therefore, when, for example, the appearance frequency information S2 has a value of "10.3" when the road attribute is "road type: urban road, area type: Aichi Prefecture" and the feature type is "pedestrian crossing," the appearance frequency information S2 means that on the urban roads in Aichi Prefecture, statistically 10.3 pedestrian crossings are provided for each 1 km of road length.

An arrangement tendency database DB6 is a database in which zone information S3 about each feature type is stored as arrangement tendency information indicating the arrangement tendency of all feature types that can be target types on the road, and functions as an arrangement tendency information storage portion. The zone information S3 is information indicating in which of multiple road zones Z divided in the longitudinal direction of the road (link k) with respect to an intersection (node n) a feature of each feature type is most likely to be placed. In other word, the zone information S3 is information indicating the road zone Z in which a feature of each feature type is likely to be placed.

In the present example, as shown in FIGS. 9A-10C, the zone information S3 divides the road into the road zones Z that differ depending on the road types indicated by the road attribute information Rb. Specifically, for an urban road, the road (link k) is divided along its longitudinal direction into the two road zones Z, that is, "end of link Za" corresponding to an end area of road and "middle of link Zb" corresponding to a middle area of road, as shown in FIG. 9A. For a narrow road, the road (link k) is divided along its longitudinal direction into the two road zones Z, that is, "on node Zc" corresponding to a middle area of intersection and "on link Zd" corresponding to a road area other than intersection, as shown in FIG. 10A. For a specific example of the zone information S3 stored in the arrangement tendency database DB6, the road zone Z indicated by the zone information S3 whose feature type is "pedestrian crossing" is "end of link Za" for urban road, and "on link Zd" for narrow road.

The target type determination section 42 functions as a target type determination portion to determine target types, based on the road attribute information Rb acquired by the road attribute information acquiring section 41, and on the recognition attribute information for each feature type predefined in relation to image recognition processing. The target types are one or two or more feature types that are targets of the image recognition processing for information collection by the image recognition section 18. In the present example, the target type determination section 42 selects the types from the feature types related to various road markings, such as pedestrian crossings, stop lines, and speed markings, provided on the road, and determines the selected types as the target types.

Figures 10A, 10B:
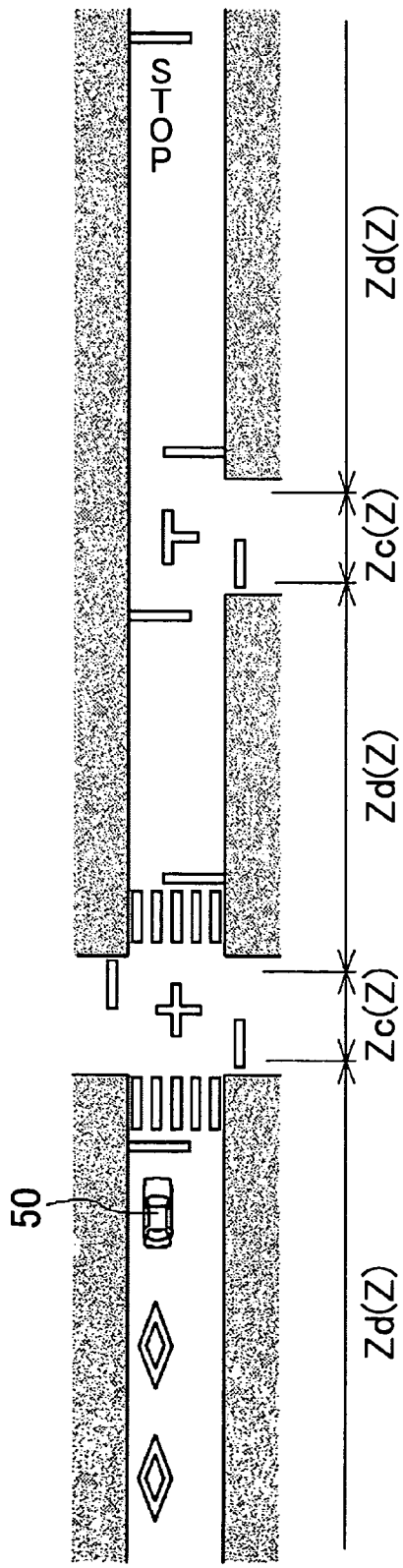
FIGS. 10A and 10B are diagrams illustrating a specific example of road zone divisions and target type determination processing, when a road type is a narrow road.

In the present example, to determine such target types appropriately, the target type determination section 42 includes a recognition frequency deriving section 43, a target type determination calculation section 44, and recognition success/failure management section 45. Therefore, the details of processing performed by the above-mentioned sections will be described below, using FIGS. 9A-10B. FIGS. 9A and 10A show specific examples of divisions of the road zone Z, and FIGS. 9B and 10B show specific examples of the target type determination processing.

The recognition frequency deriving section 43 derives a recognition frequency of each feature type, based on the appearance frequency of each feature type depending on the road attribute indicated by the road attribute information Rb, which has been acquired by the road attribute information acquiring section 41, and also based on the degree of ease of recognition in image recognition processing of each feature type indicated by the recognition attribute information. For that purpose, in the present example, the recognition frequency deriving section 43 first searches the appearance frequency database DB5, based on the road attribute information Rb acquired by the road attribute information acquiring section 41, and then acquires the appearance frequency information S2, which indicates the appearance frequency of each feature type depending on the road attribute indicated by the road attribute information Rb. Based on the road attribute information Rb indicating the road type information and the area type information about the road (link k) on which the vehicle 50 is currently traveling, the recognition frequency deriving section 43 acquires the appearance frequency information S2 corresponding to the combination of the road type information and the area type information, with respect to each feature type.

Specifically, in the case, for example, that the information "road type: urban road, area type: Aichi Prefecture" is acquired as the road attribute information Rb about the road (link k) on which the vehicle 50 is traveling, the appearance frequency information S2 about multiple feature types corresponding to this combination of the road type information and the area type information is acquired from the appearance frequency database DB5, as shown in FIG. 9B. In the example shown in the diagram, the information including "pedestrian crossing: 10.3," "stop line: 8.7," "arrow: 15.2," "no u-turn: 3.3," and "maximum speed: 3.1" is acquired as the appearance frequency information S2 about each of the feature types. In addition, in the case, for example, that the information "road type: narrow road, area type: Tokyo Metropolis" is acquired as the road attribute information Rb about the road (link k) on which the vehicle 50 is traveling, the appearance frequency information S2 about multiple feature types corresponding to this combination of the road type information and the area type information is acquired from the appearance frequency database DB5, as shown in FIG. 10B. In the example shown in the diagram, the information including "T-intersection: 9.8," "cross intersection: 10.5," "stop line: 19.6," "pedestrian crossing: 5.1," and "pedestrian crossing ahead: 5.3" is acquired as the appearance frequency information S2 about each of the feature types. For simplifying the description, these diagrams show the examples in each of which the appearance frequency information S2 about five feature types is acquired. However, the appearance frequency information S2 about more number of feature types is acquired actually.

Next, the recognition frequency deriving section 43 acquires the recognition ratio information S1 as recognition attribute information about each feature type, from the recognition attribute database DB4. For each of the multiple feature types about which the appearance frequency information S2 is acquired as described above, the recognition frequency deriving section 43 searches the recognition attribute database DB4 and acquires the recognition ratio information S1. Specifically, in the example shown in FIG. 9B, the information including "pedestrian crossing: 80%," "stop line: 55%," "arrow: 70%," "no u-turn: 90%," and "maximum speed: 80%" is acquired as the recognition ratio information S1 about each of the feature types. In addition, in the example shown in FIG. 10B, the information including "T-intersection: 90%," "cross intersection: 80%," "stop line: 55%," "pedestrian crossing: 80%," and "pedestrian crossing ahead: 60%" is acquired as the recognition ratio information S1 about each of the feature types.

Then, the recognition frequency deriving section 43 derives the recognition frequency of each feature type, based on the appearance frequency information S2 and the recognition ratio information S1 acquired. In the present example, the recognition frequency deriving section 43 obtains, as a recognition frequency, the value by multiplying the appearance frequency of each feature type indicated by the appearance frequency information S2 and the predicted recognition ratio of a feature of each feature type indicated by the recognition ratio information S1, as represented by the following formula (1).

$$(\text{Recognition frequency}) = (\text{Appearance frequency}) \times (\text{Predicted recognition ratio}) \quad (1)$$

In other words, this recognition frequency is obtained as a value corresponding to a weighted appearance frequency produced by multiplying, as a weighting factor, the predicted recognition ratio in image recognition processing of a feature of each feature type, to the appearance frequency of the feature of each feature type depending on the road attribute of the road (link k) on which the vehicle 50 is traveling. In this way, the recognition frequency becomes the information indicating an overall recognition ratio of a feature of each feature type, when the vehicle 50 performs image recognition processing of features while traveling on the road (link k) having road attributes indicated by the road attribute information Rb.

In the example shown in FIG. 9B, the recognition frequency with respect to the feature type "pedestrian crossing" is obtained to be "8.2" by multiplying "predicted recognition ratio: 80%" to "appearance frequency: 10.3." In the same way, the recognition frequency of each feature type is obtained to be "stop line: 4.8," "arrow: 10.6," "no u-turn: 3.0," or "maximum speed: 2.5." In the example shown in FIG. 10B, the recognition frequency of each feature type is obtained to be "T-intersection: 8.8," "cross intersection: 8.4," "stop line: 10.8," "pedestrian crossing: 4.1," or "pedestrian crossing ahead: 3.2." The recognition frequency deriving section 43 derives the recognition frequency of each feature type as described above.

The target type determination calculation section 44 determines the target types, which are one or two or more feature types as targets of the image recognition processing for information collection, based on the recognition frequency of each feature type derived by the recognition frequency deriving section 43. In the present example, depending on the recognition frequency of each feature type derived by the recognition frequency deriving section 43, the target type determination calculation section 44 determines one or two or more feature types that are ranked the highest in the recognition frequencies to be the target types, among all feature types possible to be the target types. However, in this case, based on the zone information S3 as arrangement tendency information about a feature of each feature type, the target type determination calculation section 44 determines the target types, putting a high priority on the feature types for which the arrangement tendency indicated by the zone information S3 of each feature type coincides with the arrangement of the vehicle 50 on the road (link k) based on the vehicle position information P. For that purpose, in the present example, referring to the zone information S3 about each feature type stored in the arrangement tendency database DB6, the target type determination calculation section 44 determines the priority of each feature type in descending order from the highest rank in the recognition frequency, for each separate road zone Z indicated by each item of the zone information S3.

In the example of the urban road shown in FIGS. 9A and 9B, among the multiple feature types of which recognition frequencies are derived by the recognition frequency deriving section 43, "pedestrian crossing" and "stop line" correspond to "end of link Za" as the road zone Z indicated by the zone information S3, while "arrow," "no u-turn," and "maximum speed" correspond to "middle of link Zb" as the road zone Z indicated by the zone information S3. Consequently, the target type determination calculation section 44 determines the orders of priority of the feature types whose road zone Z is "end of link Za" as "pedestrian crossing: 1" and "stop line: 2," in descending order from the highest rank in the recognition frequency among the feature types included in the road zone Z. Similarly, the target type determination calculation section 44 determines the orders of priority of the feature types whose road zone Z is "middle of link Zb" as "arrow: 1," "no u-turn: 2," and "maximum speed: 3," in descending order from the highest rank in the recognition frequency among the feature types included in the road zone Z. In the example shown in FIG. 9A, "end of link Za" contains the zone in the vicinity of the intersection (node n) including pedestrian crossings placed on both sides of the intersection (node n) and a stop line, and the other zone on the road (link k) is included in "middle of link Zb."

In the example of the narrow road shown in FIGS. 10A and 10B, among the multiple feature types of which recognition frequencies are derived by the recognition frequency deriving section 43, "T-intersection" and "cross intersection" correspond to "on node Zc" as the road zone Z indicated by the zone information S3, while "stop line," "pedestrian crossing," and "pedestrian crossing ahead" correspond to "on link Zd" as the road zone Z indicated by the zone information S3. Consequently, the target type determination calculation section 44 determines the orders of priority of the feature types whose road zone Z is "on node Zc" as "T-intersection: 1" and "cross intersection: 1," in descending order from the highest rank in the recognition frequency among the feature types included in the road zone Z. Note that, in this example, the priority orders of both "T-intersection" and "cross intersection" are "1" in spite of the difference in their recognition frequency. This is because "T-intersection" and "cross intersection" are not placed in the same position, causing no positional conflict. Furthermore, because they share a common shape, a common image recognition processing can be used to recognize their images by setting both of them as target types at the same time. In addition, the target type determination calculation section 44 determines the orders of priority of the feature types whose road zone Z is "on link Zd" as "stop line: 1," "pedestrian crossing: 2," and "pedestrian crossing ahead: 3," in descending order from the highest rank in the recognition frequency among the feature types included in the road zone Z. In the example shown in FIG. 10A, "on link Zd" contains the zone on the road (link k) including pedestrian crossings and stop lines placed on both sides of the intersection (node n), and the other zone in the vicinity of the intersection (node n) is included in "on node Zc."

Then, the target type determination calculation section 44 determines the target types for each road zone Z, based on the order of priority of each feature type for each road zone Z. In the present example, the target type determination calculation section 44 determines the feature types whose order of priority for each road zone Z is "1" to be the target types. Therefore, in the example shown in FIG. 9B, the feature type is determined to be "pedestrian crossing" when the road zone Z is "end of link Za," and the feature type is determined to be "arrow" when the road zone Z is "middle of link Zb." Similarly, in the example shown in FIG. 10B, the feature types are determined to be "T-intersection" and "cross intersection" when the road zone Z is "on node Zc," and the feature type is determined to be "stop line" when the road zone Z is "on link Zd."

In addition, in the present example, in determining the target types as described above, the target type determination calculation section 44 refers to the type failure information S4 stored in the recognition success/failure management section 45, and based on the past information about the success or failure of image recognition of the target feature, determines the target types. In this case, the target type determination calculation section 44 first searches the recognition success/failure management section 45, based on the vehicle position information P, and extracts the type failure information S4 about the road zone Z in which the vehicle 50 travels. As will be described later, in the present example, the type failure information S4 is information indicating that image recognition of features of target types determined for each road zone Z has failed in the past, and the information includes information that indicates the target types whose image has failed to be recognized by the image recognition and information that indicates the particular road zone Z corresponding to the area in which the image recognition has failed.

Then, if the type failure information S4 about the road zone Z in which the vehicle 50 travels is acquired, the target type determination calculation section 44 makes an adjustment to change orders of priority of the feature types with respect to the road zone Z, so that the order of the feature type indicated by the type failure information S4 moves down. Specifically, the target type determination calculation section 44 changes the orders of priority so that the order of the feature type indicated by the type failure information S4 comes to the lowest rank. At the same time, the target type determination calculation section 44 also moves up the orders of priority of other feature types in turn. Then, the target type determination calculation section 44 determines the feature types whose order of priority after the change is "1" to be the target types. For example, in the example shown in FIG. 9B, it is assumed that the type failure information S4 indicating a past failure in image recognition of the target type "arrow" is acquired, in a particular road zone Z of middle of link Zb in the traveling direction of the vehicle 50. In that case, the target type determination calculation-section 44 changes the order of priority of "arrow" to the lowest order. Consequently, as orders of priority in the particular road zone Z, "no u-turn" moves up to "1," and "maximum speed" to "2" in turn. As a result, in this case, the target type determination calculation section 44 determines "no u-turn" to be the target type, according to the order of priority after change.

The recognition success/failure management section 45 functions as a recognition success/failure management portion to manage information about the success or failure of image recognition of target features in the past, in relation to the image recognition processing for information collection. For this purpose, based on the vehicle position information P, the recognition success/failure management section 45 generates the type failure information S4, for each road zone Z (an example of predefined area), as recognition success/failure information indicating the success or failure of image recognition of the target features of the target types determined by the target type determination calculation section 44, and then stores the generated type failure information S4.

In the present example, with respect to the image recognition processing for information collection of the target features of the target types that have been determined in the past by the target type determination calculation section 44 for each road zone Z, if no image of the target feature has been recognized in whole of each road zone Z, the image recognition has failed. The type failure information S4 is information to indicate the fact that the image recognition has failed. Therefore, in this example, the type failure information S4 includes information that indicates the target types whose image has failed to be recognized by the image recognition and information that indicates the particular road zone Z corresponding to the area in which the image recognition has failed. The "particular road zone Z" included in the type failure information S4 is information with which a road zone Z in which the image recognition has failed can be identified, unlike the zone information S3 stored in the arrangement tendency database DB6, which identifies only the type of road zone Z such as "end of link Za" or "middle of link Zb." Therefore, the "particular road zone Z" included in the type failure information S4 is obtained based on the vehicle position information P at the time of passing the particular road zone Z in which the image recognition has failed, and also based on the road information Ra. Then, the particular road zone Z is rendered, for example, to be information associated with a particular link k in which the particular road zone Z exists.

Then, with respect to the image recognition processing of the target feature in the particular road zone Z, the recognition success/failure management section 45 counts the number of failures in the image recognition, and if a predefined number (for example, 1, 5, or 10) of failures have occurred consecutively, generates and stores the type failure information S4. As a result, after a predefined number of failures in the image recognition processing of the features of the target types determined by the target type determination calculation section 44 with respect to a particular road zone Z, the target types with respect to the particular road zone Z are changed. Therefore, in the image recognition processing for information collection, it becomes possible to efficiently perform image recognition of target features, and learning of the target features.

Next, an exemplary feature information management method will be explained with respect to FIGS. 11-13. The exemplary method may be implemented, for example, by one or more components of the above-described apparatus 1. However, even though the exemplary structure of the above-described apparatus 1 may be referenced in the description, it should be appreciated that the structure is exemplary and the exemplary method need not be limited by any of the above-described exemplary structure.

Figure 11:
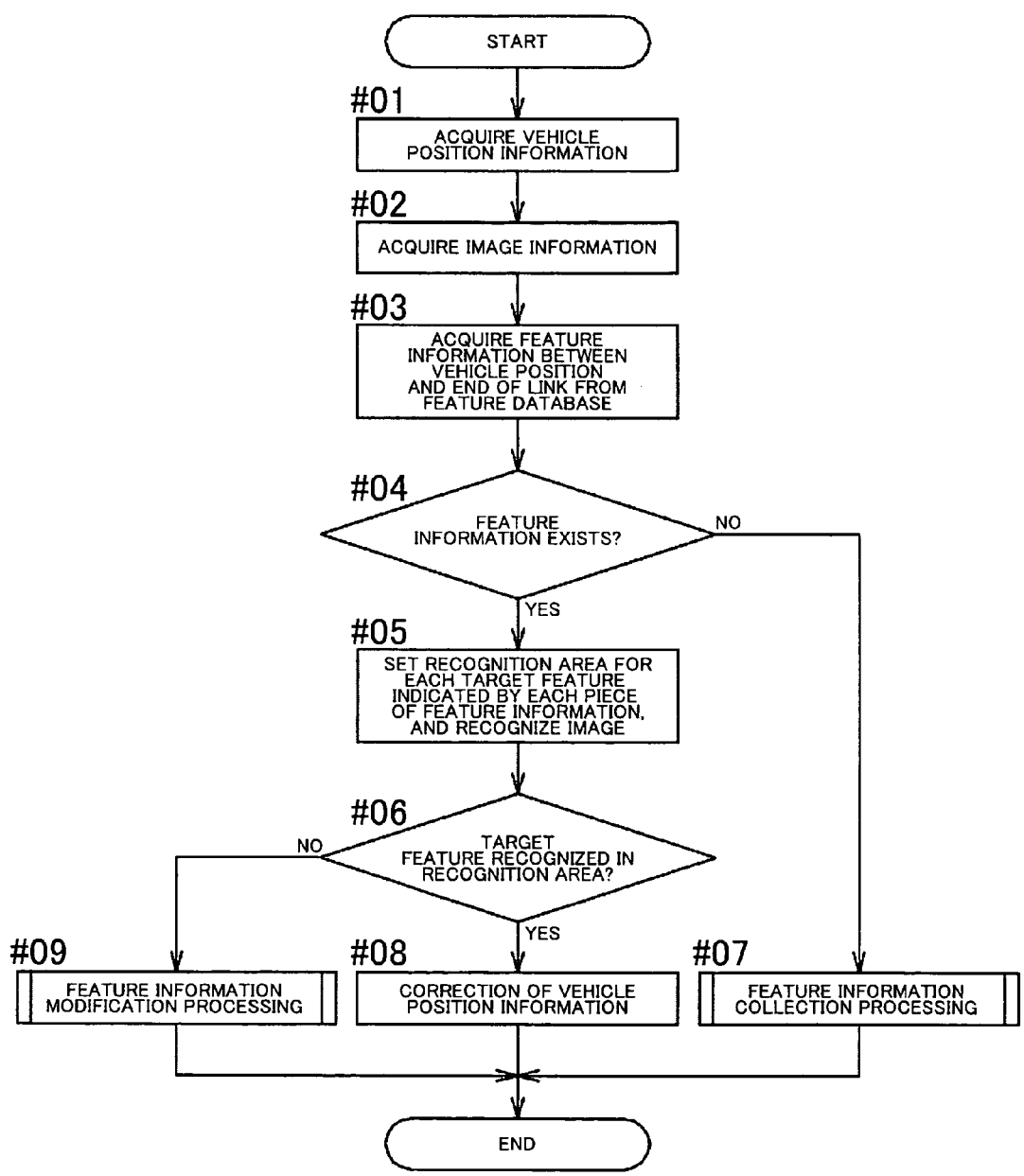
FIG. 11 is a flowchart that shows an exemplary feature information management method.

As shown in FIG. 11, in the navigation apparatus 1, first the vehicle position information acquiring section 16 acquires the vehicle position information P (step #01). Next, the image information acquiring section 12 acquires the image information G in the vicinity of the vehicle 50 taken by the imaging apparatus 11 (step #02). Then, the feature information acquiring section 17 acquires from the feature database DB2 the feature information F about target features existing between the current position of the vehicle 50 (vehicle position) indicated by the vehicle position information P and the end of the link k representing the road on which the vehicle 50 is traveling (step #03). If the feature information F has not been acquired in step #03 (step #04: No), the navigation apparatus 1 executes the feature information collection processing (step #07). An example of the feature information collection processing will later be described in detail, based on a flowchart shown in FIG. 12.

On the other hand, if the feature information F has been acquired in step #03 (step #04: Yes), the image recognition section 18 sets a recognition area E for each target feature indicated by each piece of the feature information F acquired in step #03, and performs image recognition processing, in the next step (step #05). This image recognition processing in step #05 is the image recognition processing for position correction by the image recognition section 18, described above. Then, if the image of the target feature has been recognized in the recognition area E (step #06: Yes) in step #05, the vehicle position information correction section 19 corrects the vehicle position information P, based on the result of image recognition of the target feature and on the position information about the target feature included in the feature information F about the target feature (step #08). On the other hand, if the image of the target feature has not been able to be recognized in the recognition area E (step #06: No), the navigation apparatus 1 executes the feature information modification processing (step #09). The feature information modification processing will later be described in detail, based on a flowchart shown in FIG. 14. Then, the overall operation processing of the navigation apparatus 1 ends as described above.

An exemplary feature information collecting method will be explained with reference to FIG. 12. The exemplary method may be implemented, for example, by one or more components of the above-described apparatus 1. However, even though the exemplary structure of the above-described apparatus 1 may be referenced in the description, it should be appreciated that the structure is exemplary and the exemplary method need not be limited by any of the above-described exemplary structure.

Figure 12:
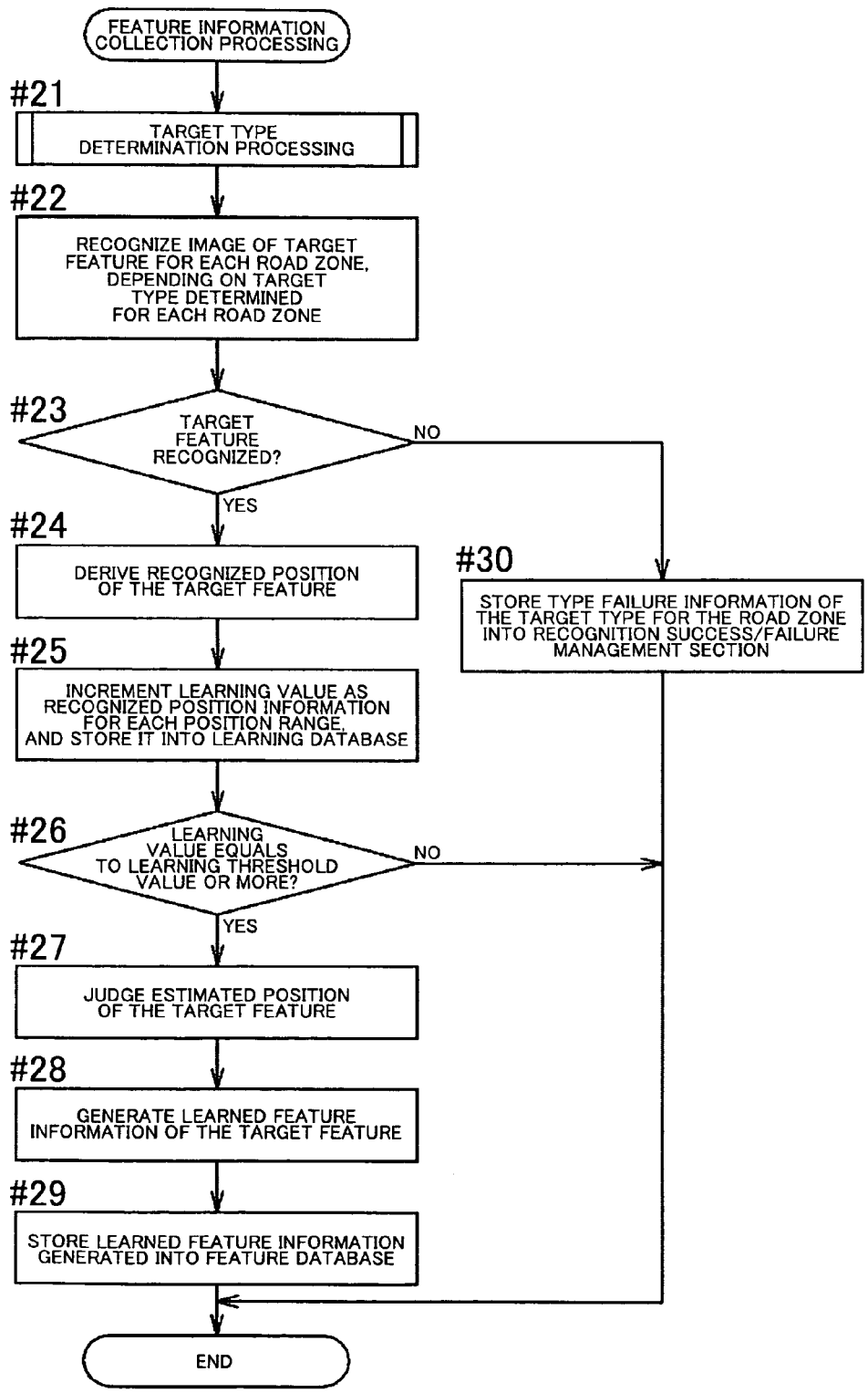
FIG. 12 is a flowchart that shows an exemplary feature information collecting method.

As shown in FIG. 12, first the target type determination section 42 performs the target type determination processing (step #21). This target type determination processing is a processing to determine, as a target type among multiple feature types that can be a target type, the feature type to be recognized by the image recognition processing for information collection. In this processing, the target type is determined for each predefined road zone Z (refer to FIGS. 9A-10B). An example of the target type determination processing will later be described in detail, based on a flowchart shown in FIG. 13. Next, the image recognition section 18 performs image recognition processing of the target feature in each road zone Z, depending on the target type determined for each road zone Z in step #21 (step #22). In this processing, the image recognition section 18 sets the feature of the target type determined for each road zone Z as a target feature, and performs image recognition of the target feature. This image recognition processing in step #22 is the image recognition processing for information collection by the image recognition section 18, described above. Then, if the image of the target feature has not been able to be recognized in one road zone Z (step #23: No), the type failure information S4 (refer to FIG. 1) indicating a failure in image recognition of the target type, which has been determined in step #21, in the road zone Z is stored into the recognition success/failure management section 45 (step #30).

On the other hand, if the image recognition section 18 has recognized the image of the target feature (step #23: Yes), the recognized position deriving section 32 derives the recognized position of the target feature, based on the vehicle position information P acquired in step #01 (step #24). Next, the recognized position deriving section 32 generates the recognized position information Aa indicating the recognized position of the target feature, derived in step #24, as a learning value for the predefined position range to which the recognized position belongs, and, by incrementing the learning value for each position range, as shown in FIGS. 5B and 7, stores it into the learning database DB3 (step #25). If the learning value as the recognized position information Aa about the target feature stored in the learning database DB3 is less than the predefined learning threshold value T1 (step #26: No), processing ends without further operation.

On the other hand, if the learning value as the recognized position information Aa about the target feature stored in the learning database DB3 is equal to or more than the predefined learning threshold value T1 (step #26: Yes), the estimated position judgment section 34 judges the estimated position pg of the target feature (step #27). Then, the feature information generating section 36 generates the learned feature information Fb about the target feature that associates the estimated position pg judged in step #27 with the feature attribute information based on the image recognition result (step #28). Then, the learned feature information Fb, thus generated, is stored into the feature database DB2 (step #29). The feature information collection processing ends as described above.

An exemplary target class determining method will be explained with reference to FIG. 13. The exemplary method may be implemented, for example, by one or more components of the above-described apparatus 1. However, even though the exemplary structure of the above-described apparatus 1 may be referenced in the description, it should be appreciated that the structure is exemplary and the exemplary method need not be limited by any of the above-described exemplary structure.

Figure 13:
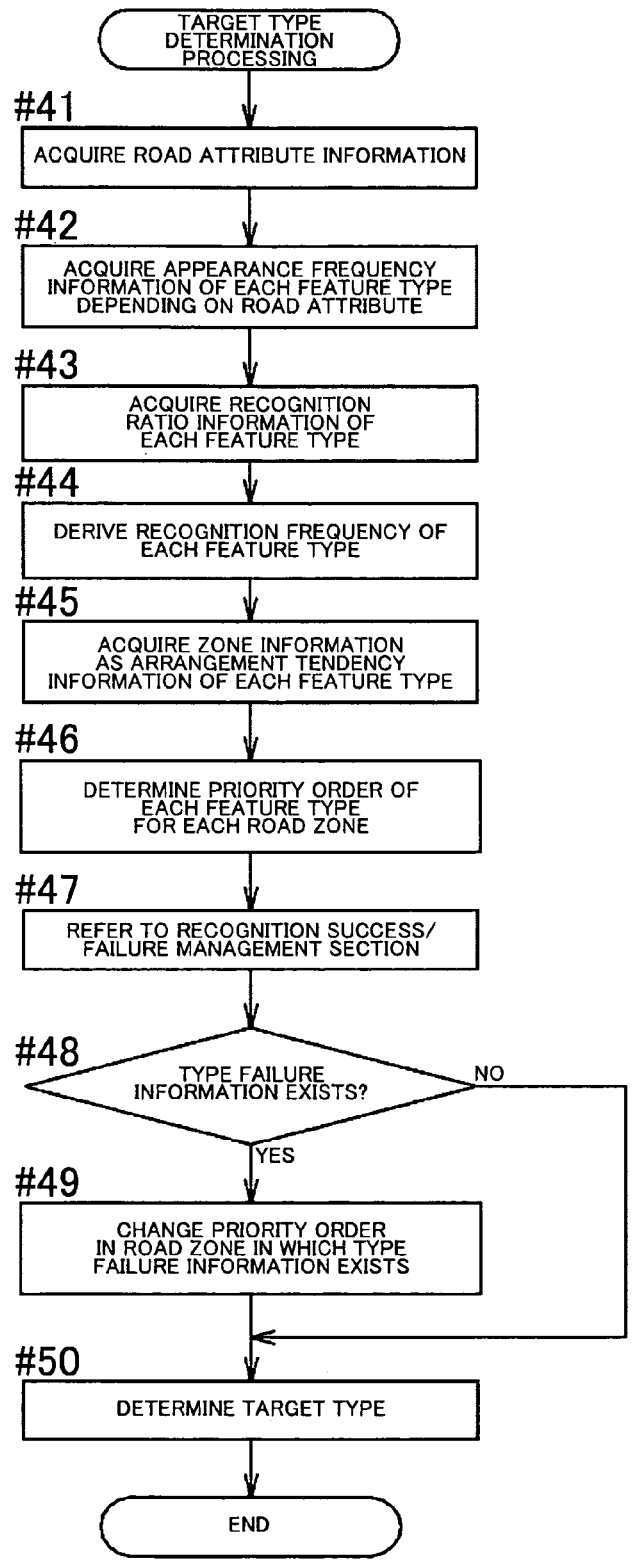
FIG. 13 is a flowchart that shows an exemplary target type determining method.

As shown in FIG. 13, first the road attribute information acquiring section 41 acquires, from the map database DB1, the road attribute information Rb (refer to FIG. 1) about the road (link k) on which the vehicle 50 is traveling, based on the vehicle position information P acquired in step #01 (step #41). Next, the recognition frequency deriving section 43 in the target type determination section 42 acquires, from the appearance frequency database DB5, the appearance frequency information S2 (refer to FIG. 1) for each feature type that depends on the road attribute information Rb acquired in step #41 (step #42). In addition, the recognition frequency deriving section 43 acquires the recognition ratio information S1, about each feature type, from the recognition attribute database DB4 (step #43). Then, based on the information acquired by steps #41 to #43, the recognition frequency deriving section 43 derives the recognition frequency of each feature type (step #44). The method for deriving the recognition frequency of each feature type by the recognition frequency deriving section 43 is as already described above.

Next, the target type determination calculation section 44 in the target type determination section 42 acquires, from the arrangement tendency database DB6, the zone information S3 as arrangement tendency information about each feature type (step #45). Then, the target type determination calculation section 44 determines the priority order of each feature type in each predefined road zone Z indicated by the zone information S3 (step #46). Specifically, as described above, the target type determination calculation section 44 determines the priority order of each feature type so that the feature type with higher recognition frequency is ranked higher in each predefined road zone Z indicated by the zone information S3. Then, the target type determination section 42 refers to the recognition success/failure management section 45 (step #47), and judges whether the type failure information S4 about the road zone Z, for which the priority orders have been determined in step #46, is stored in the recognition success/failure management section 45 (step #48). If the type failure information S4 as described above is not stored in the recognition success/failure management section 45 (step #48: No), processing proceeds to #50. On the other hand, if the type failure information S4 about the road zone Z, for which the priority orders have been determined in step #46, is stored in the recognition success/failure management section 45 (step #48: Yes), the priority orders for the road zone Z having the type failure information S4 are changed. Specifically, as described above, the priority orders are changed so that the feature type indicated by the type failure information S4 is ranked lower. Then, the target type determination calculation section 44 determines one or two or more target types, according to the order of priority of each feature type determined by steps #46 and #49 (step #50). The target type determination processing ends as described above.

Figure 14:
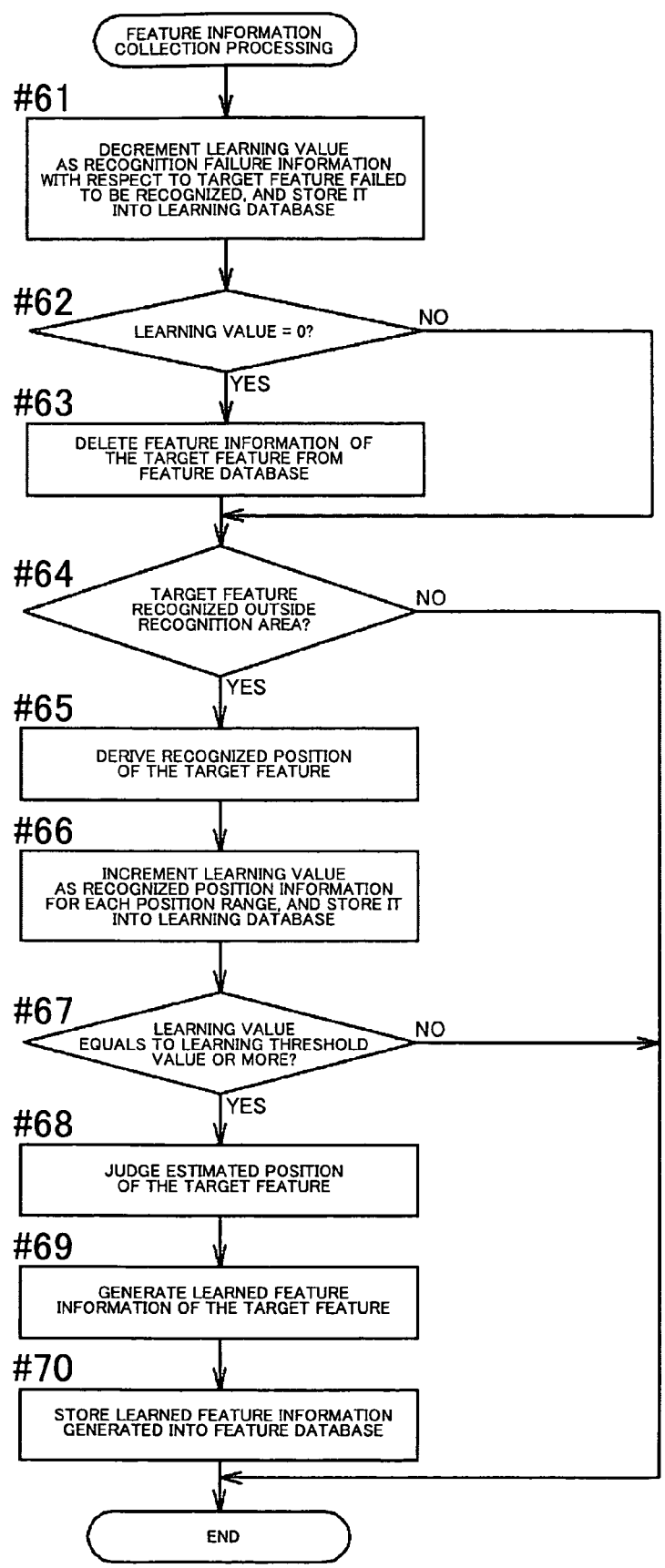
FIG. 14 is a flowchart that shows an exemplary feature information modification method.

Next, an exemplary feature information modifying method according to the present example will be explained with reference to FIG. 14. The exemplary method may be implemented, for example, by one or more components of the above-described apparatus 1. However, even though the exemplary structure of the above-described apparatus 1 may be referenced in the description, it should be appreciated that the structure is exemplary and the exemplary method need not be limited by any of the above-described exemplary structure.

When a target feature has failed to be recognized in the recognition area E in the image recognition processing for position correction in step #5 (step #06: No), the recognition failure processing section 33 first generates a learning value as the recognition failure information Ac about the target feature, and, by decrementing the learning value with respect to the target feature, as shown in FIGS. 6B and 8, stores the learning value into the learning database DB3, as shown in FIG. 14 (step #61). If the learning value is not zero (step #62: No), processing proceeds to step #64. If the learning value is zero (step #62: Yes), in other words, if the learning value is equal to or less than the deletion threshold value T2, the deletion management section 38 deletes the feature information F of the target feature from the feature database DB2 (step #63).

Then, the recognition failure processing section 33 judges whether a target feature has been recognized outside the recognition area E, in the image recognition processing for position correction in step #5 (step #64). If no target feature has been recognized outside the recognition area E (step #64: No), processing ends without further operation. If a target feature has been recognized outside the recognition area E (step #64: Yes), the recognized position deriving section 32 performs the same processing as that of steps #24 to #29, which is performed when an image of a target feature is recognized in the image recognition processing for information collection. In other words, the recognized position deriving section 32 derives the recognized position of the target feature, based on the vehicle position information P acquired in step #01 (step #65). Next, as shown in FIG. 6B as the example of the pedestrian crossing f5, the recognized position deriving section 32 generates the recognized position information Aa indicating the recognized position of the target feature, derived in step #65, as a learning value for the predefined position range to which the recognized position belongs, and, by incrementing the learning value for each position range, stores it into the learning database DB3 (step #66). If the learning value as the recognized position information Aa about the target feature stored in the learning database DB3 is less than the predefined learning threshold value T1 (step #67: No), processing ends without further operation.

On the other hand, if the learning value as the recognized position information Aa about the target feature stored in the learning database DB3 is equal to or more than the predefined learning threshold value T1 (step #67: Yes), the estimated position judgment section 34 judges the estimated position pg of the target feature (step #68). Then, the feature information generating section 36 generates the learned feature information Fb about the target feature that associates the estimated position pg judged in step #68 with the feature attribute information based on the image recognition result (step #69). Then, the learned feature information Fb, thus generated, is stored into the feature database DB2 (step #70). The feature information modification processing ends as described above.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

In the above example, the recognized position deriving section 32 derives the recognized position of the target feature indicated by the recognized position information Aa as information that indicates the position on the road of the target feature on the basis of the vehicle position information P. However, the recognized position information Aa of the present invention need not be limited to such position information. Therefore, for example, the recognized position of a target feature indicated by the recognized position information Aa may be the position of the vehicle 50 that is indicated by the vehicle position information P at the time when the image information G including the image of the target feature is acquired. In this case, it is possible that, when the feature information generating section 36 generates the learned feature information Fb, the recognized position deriving section 32 calculates, relative to the vehicle 50, the position on the road of the target feature included in the image information G, based on the installation position, installation angle, and viewing angle of the imaging apparatus 11, and the recognized position deriving section 32 renders the position on the road of the target feature to be the position information included in the learned feature information Fb about the target feature.

In the above example, based on the distribution of multiple pieces of the recognized position information Aa about the same target feature, the estimated position judgment section 34 judges the mode value of the distribution as an estimated position pg of the target feature. However, the method for judging the estimated position pg by the estimated position judgment section 34 need not be limited to the above example. Instead, based on the distribution of the recognized position information Aa, other representative value such as mean value or median value of the distribution is judged as an estimated position pg of the target feature.

In the above example, the recognized position deriving section 32 increments the learning value by one, every time when image recognition of one target feature is made successfully. However, for example, a constitution in which the image recognition section 18, when it performs image information processing of a target feature, judges a degree of confidence of recognition that indicates a likeliness that the target feature is a target feature of the target type determined by the target type determination section 42 based on the result of image recognition, and adds to the learning value a value that differs depending on the degree of confidence of recognition is also possible. In other words, it is possible to have a constitution in which, when a learning value as the recognized position information Aa is added for each position range and stored into the learning database DB3, if the degree of confidence that the target feature is a target feature of the relevant feature type is high, a large value is added as a learning value, and if the degree of confidence is low, a small value is added as a learning value. In addition, it is also possible that the learning value to be added every time when image recognition of a target feature is made successfully may be a negative value, not limited to a positive value. Furthermore, the learning value may also be preferable to be a decimal number, not limited to an integer.

In the above example, every time image recognition of a target feature fails, the recognition failure processing section 33 subtracts the learning value as the recognition failure information Ac about the target feature from the predefined initial value Td, and when the learning value becomes zero, deletes the feature information F about the target feature from the feature database DB2. However, for example, the initial value Td of the learning value may be set to zero, then every time when image recognition fails, the learning value is decremented, and when it becomes equal to or less than the predefined deletion threshold value T2 that is set to a negative value, the feature information F about the target feature is deleted from the feature database DB2. In addition, it is also possible that the learning value to be subtracted every time when image recognition of a target feature fails may be a negative value, not limited to a positive value. Moreover, the learning value may also be a decimal number or a fractional number, not limited to an integer. Furthermore, a constitution of the recognition failure information Ac stored in the learning database DM3 need not be limited to such a constitution as using a learning value, but it can use various forms of information that is appropriate to memorize that image recognition of a target feature indicated by the feature information F has failed.

The division into the databases DB1 to DB6 in the above example is only an example. There can be adopted any constitution in which, for example, the feature database DB2 and the learning database DB3 are integrated into one database, or the map database DB1 and the feature database DB2 are integrated into one database.

In the above example, the range between the current position of the vehicle 50 (vehicle position) indicated by the vehicle position information P and the end of the link k representing the road on which the vehicle 50 is traveling is assumed to be the range around the vehicle 50 used for judging whether a target feature stored as the feature information F exists in the vicinity of the vehicle 50. However, this is only an example. It is possible to assume a range defined by other standard to be the range around the vehicle 50. Therefore, for example, a constitution in which a range within a certain distance not measured by a unit of link k from the current position of the vehicle 50 is assumed to be the range around the vehicle 50 is also possible.

In the above example, description has been made of the example constitution of the feature information collection apparatus 2 in which two kinds of processing can be performed: (1) feature information collection processing, which, if a target feature stored as the feature information F does not exist in the vicinity of the vehicle 50, the position of the target feature based on the result of image recognition targeting a feature of a predefined target type is learned, and the feature information F is generated; and (2) feature information modification processing, which, if a target feature stored as the feature information F exists in the vicinity of the vehicle 50, and image recognition of a target feature indicated by the feature information F has failed, the feature information F is deleted or modified. However, for example, a constitution in which only either of the feature information collection processing, and the feature information modification processing or deletion processing of feature information can be executed is possible.

In the above example, the recognition frequency deriving section 43 in the target type determination section 42 acquires the appearance frequency information S2 and the recognition ratio information S1, and then multiplies the appearance frequency of each feature type depending on the road attribute indicated by the appearance frequency information S2 and the predicted recognition ratio of a feature of each feature type indicated by the recognition ratio information S1, to obtain a recognition frequency. However, for example, a constitution is possible in which, using a recognition frequency table that defines recognition frequencies for all combinations of road attributes and target types, a recognition frequency of each feature type is obtained with reference to the recognition frequency table and based on the road attribute information Rb acquired by the road attribute information acquiring section 41.

In the above example, when determining the target types for each road zone Z based on the order of priority of each feature type in each road zone Z, the feature type whose order of priority in the road zone Z is "1" is determined to be the target type. This is because it is effective to suppress the number of target types for reducing the load of image recognition by the image recognition section 18. When the image recognition section 18 has a sufficient calculation processing capacity, feature types other than those whose order of priority in the road zone Z is "1" can be target types to increase the number of target types. Moreover, in this case, feature types in other road zone Z can also be target types.

In the above example, the road type information and the area type information are acquired as the road attribute information Rb, and based on these information items, the appearance frequency of each feature type on the road on which the vehicle 50 is traveling is obtained. However, a constitution is possible in which road attributes other than road type and area-type are acquired as the road attribute information Rb, if they have an influence on appearance frequency of a feature type. Therefore, for example, a constitution is possible in which information such as link length, road width, and link shape is acquired as the road attribute information Rb.

In the above example, to determine target types, the recognition ratio information S1 indicating the predicted recognition ratio of a feature of each feature type is acquired as recognition attribute information of each feature type. However, the recognition attribute information of each feature type used to determine target types need not be limited to information about predicted recognition ratio. Various kinds of information having an influence on image recognition processing of features of each feature type can be used as recognition attribute information to determine target types.

In the above example, in determining target types, the zone information S3 about each feature type stored in the arrangement tendency database DB6 is referred to, and for each road zone Z indicated by each item of the zone information S3, the order of priority of each feature type is determined in descending order from the highest rank in the recognition frequency. However, for example, a constitution is possible in which target types are determined without using arrangement tendency information of a feature of each feature type such as the zone information S3. In this case, the constitution may be, for example, such that, depending on the recognition frequency of each feature type derived by the recognition frequency deriving section 43, one or two or more feature types that are ranked the highest in the recognition frequencies are determined to be the target types, among all feature types possible to be the target types.

In the above example, in determining target types, the type failure information S4 stored in the recognition success/failure management section 45 is referred to, and based on the past information about the success or failure of image recognition of target features, target types are determined. However, for example, a constitution is possible in which the recognition success/failure management section 45 is not included, and without reference to the past result of success or failure of image recognition of target features, target types are determined by determining the priority orders of the feature types uniformly based on information such as the recognition frequency of each feature type derived by the recognition frequency deriving section 43.

In the above example, the features of feature types selected from various kinds of road markings provided on the road surface are rendered to be target features. However, various features provided in the vicinity of a road can be target features. Therefore, various kinds of features such as, for example, traffic signs, information signs, signboards, traffic lights, and manholes can be target features.

Figure 15:
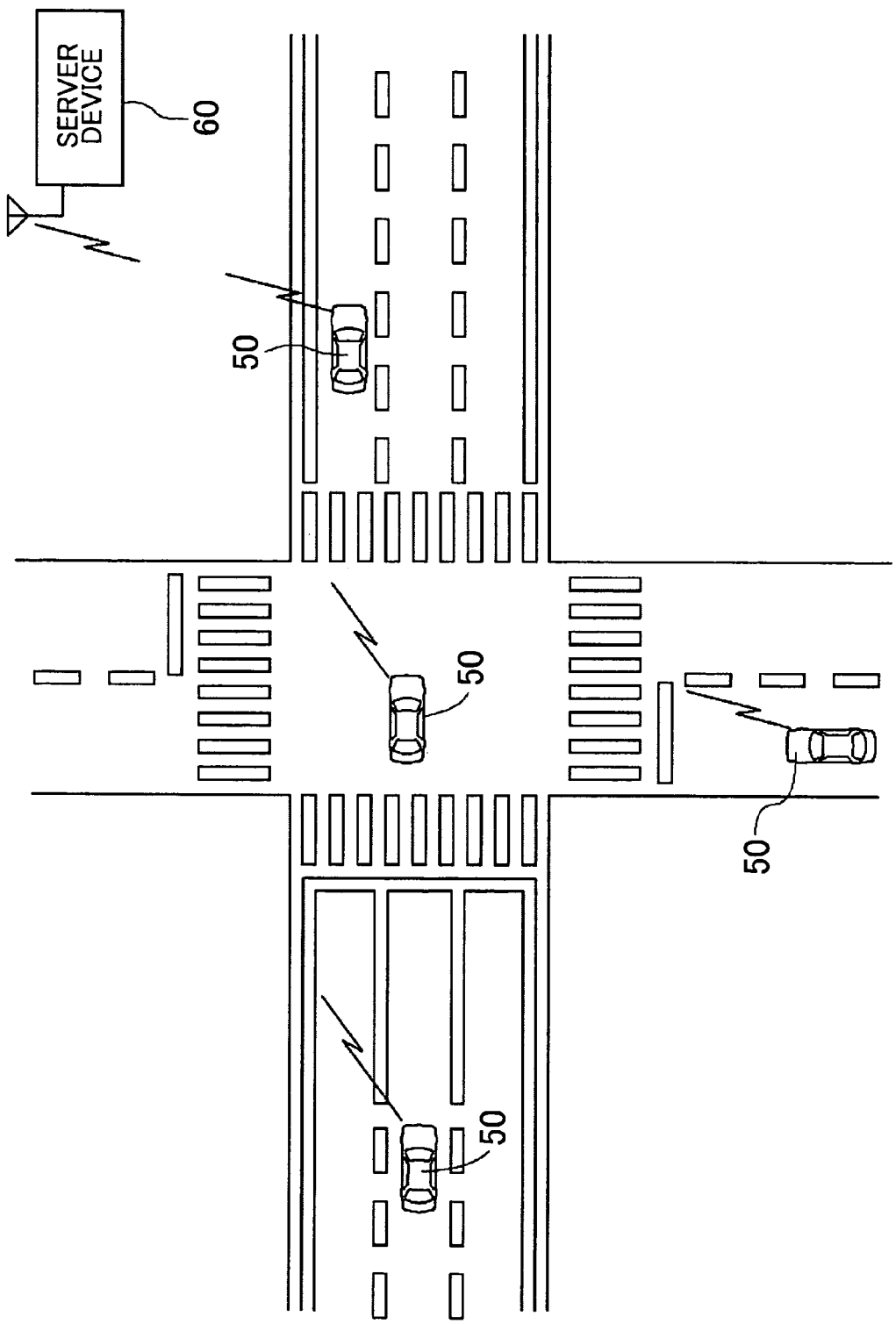
FIG. 15 is a drawing that shows an example of a feature information collecting apparatus including a server.

In the above example, all components of the feature information collection apparatus 2 of the present invention are mounted on the vehicle 50. However, for example, a constitution is possible in which part of the components of the feature information collection apparatus 2 including the learning database DB3 as the recognition result storage portion of the present invention are installed in a server device 60, which is communicably connected to multiple vehicles 50 via wireless communication links, etc., as shown in FIG. 15. By having the feature information collection apparatus 2 in such a constitution, the result of learning of target features by the multiple vehicles 50 can be accumulated in the learning database DB3 installed in the server device 60. As a result, using more quantities of the recognized position information Aa and the recognition failure information Ac, the feature information F about target features having position information of higher accuracy can be generated. Moreover, components of the feature information collection apparatus 2 installed in the server device 60 are not limited to the learning database DB3, but all components except the components, such as the imaging apparatus 11 and the vehicle position information acquiring section 16, that are necessary to be mounted on the vehicle 50 can be installed in the server device 60. Furthermore, part of the components of the image recognition apparatus 3, the vehicle position recognition apparatus 4, and the navigation apparatus 1 can be installed in the server device 60.

In the above example, it is obviously possible to use the apparatuses for applications other than the above-described example. For example, the vehicle position recognition apparatus 4 that includes the image recognition apparatus 3 and the feature information collection apparatus 2 of the present invention can be used for a drive control apparatus for vehicle.

What is claimed is:

1. An feature information management apparatus comprising:
   a memory that stores a plurality of target types, each target type having recognition attribute information indicating a likelihood that the target type will be recognized based on a type of road or a type of area, and each target type having success or failure information indicating a success or failure of image recognition of the target type in the past;
   a controller that:
      acquires vehicle position information indicating a current position of a vehicle;
      acquires image information in a vicinity of the vehicle;
      acquires road attribute information about a road on which the vehicle is traveling, the road attribute information acquired based on the vehicle position information;
      evaluates the success or failure information of each target type, the evaluation based on the vehicle position information; and
      determines a target type defining a target for image recognition within the image information, the target type being determined based on the acquired road attribute information, the stored recognition attribute information, and the evaluation; and
      performs image recognition of a target feature included in the image information, the target feature being of the determined target type.

2. The feature information management apparatus according to claim 1, wherein:
   the road attribute information includes frequency of appearance information for each feature type and ease of recognition information for each feature type;
   the controller determines a recognition frequency for each feature type based on the road attribute information, the recognition frequency indicating a greater likelihood of being recognized during image recognition; and
   based on the recognition frequency, the controller determines a feature type having a highest recognition frequency to be the target type defining the target for image recognition.

3. The image recognition apparatus according to claim 2, wherein the ease of recognition information includes recognition ratio information indicating the likelihood of success of recognition, the ratio defined based on properties of each feature type including at least one of shape, size, color, or likelihood of blurring.

4. The image recognition apparatus according to claim 1, wherein the road attribute information includes at least one of road type information or area type information.

5. The feature information management apparatus according to claim 1, wherein:
   based on arrangement tendency information for each feature type indicating an arrangement tendency of a feature of each feature type on the road, the controller determines the target type, putting a high priority on a feature type for which an arrangement tendency indicated by the arrangement tendency information coincides with an arrangement of the vehicle on the road based on the vehicle position information.

6. The feature information management apparatus according to claim 5, wherein the arrangement tendency information includes zone information that indicates in which zone, of multiple road zones divided in the direction of the road length with respect to an intersection, a feature of each feature type is most likely to be placed.

7. The feature information management apparatus according to claim 1, wherein a feature type that can be the target type is a feature type selected from various road markings provided on the road surface.

8. The feature information management apparatus according to claim 1, wherein:
   the memory stores recognized position information indicating a position of a recognized target feature recognized by the image recognition portion, the recognized position determined based on the vehicle position information.

9. The feature information management apparatus according to claim 8, wherein the controller determines an estimated position of the recognized target feature, based on multiple items of the recognized position information about the recognized target feature.

10. The feature information management apparatus according to claim 9, wherein the memory stores position information indicating an estimated position for a plurality of target features as feature information associated with attribute information.

11. The feature information management apparatus according to claim 8, wherein memory communicates with multiple vehicles, and stores the recognized position information by received from the multiple vehicles.

12. An feature information management method comprising:
   accessing a memory that stores a plurality of target types, each target type having recognition attribute information indicating a likelihood that the target type will be recognized based on a type of road or a type of area, and each target type having success or failure information indicating the success or failure of image recognition of the target type in the past;
   acquires vehicle position information indicating a current position of a vehicle;
   acquiring image information in a vicinity of the vehicle;
   acquiring road attribute information about a road on which the vehicle is traveling, the road attribute information acquired based on the vehicle position information;
   evaluating the success or failure information of each target type, the evaluation based on the vehicle position information; and
   determining a target type defining a target for image recognition within the image information, the target type being determined based on the acquired road attribute information, the stored recognition attribute information, and the evaluation; and
   performing image recognition of a target feature included in the image information, the target feature being of the determined target type.

13. The feature information management method according to claim 12, wherein:
   the road attribute information includes frequency of appearance information for each feature type and ease of recognition information for each feature type; and
   the method further comprises:
      determining a recognition frequency for each feature type based on the road attribute information, the recognition frequency indicating a greater likelihood of being recognized during image recognition; and based on the recognition frequency, determining a feature type having a highest recognition frequency to be the target type defining the target for image recognition.

14. The image recognition method according to claim 13, wherein the ease of recognition information includes recognition ratio information indicating the likelihood of success of recognition, the ratio defined based on properties of each feature type including at least one of shape, size, color, or likelihood of blurring.

15. The feature information management method according to claim 1, further comprising:
based on arrangement tendency information for each feature type indicating an arrangement tendency of a feature of each feature type on the road, determining the target type, putting a high priority on a feature type for which an arrangement tendency indicated by the arrangement tendency information coincides with an arrangement of the vehicle on the road based on the vehicle position information.

16. The feature information management apparatus according to claim 15, wherein the arrangement tendency information includes zone information that indicates in which zone, of multiple road zones divided in the direction of the road length with respect to an intersection, a feature of each feature type is most likely to be placed.

17. The feature information management method according to claim 12, further comprising:
storing recognized position information indicating a position of a recognized target feature recognized by the image recognition portion, the recognized position determined based on the vehicle position information.

18. The feature information management method according to claim 17, wherein the memory stores position information indicating an estimated position for a plurality of target features as feature information associated with attribute information.

* * * * *